(12) United States Patent
Mawdesley et al.

(10) Patent No.: US 11,731,042 B2
(45) Date of Patent: Aug. 22, 2023

(54) MULTI-PLAYER GAME SYSTEM

(71) Applicant: G Gaming Limited, London (GB)

(72) Inventors: Christopher Mawdesley, Newcastle-Upon-Tyne (GB); Nathan Williams, Cardiff (GB); Paul Dolman-Darrall, London (GB)

(73) Assignee: G GAMING LIMITED, London (GB)

( * ) Notice: Subject to any disclaimer, the term of this patent is extended or adjusted under 35 U.S.C. 154(b) by 25 days.

(21) Appl. No.: 17/206,743

(22) Filed: Mar. 19, 2021

(65) Prior Publication Data

US 2022/0266133 A1 Aug. 25, 2022

(30) Foreign Application Priority Data

Feb. 18, 2021 (GB) ...................................... 2102280

(51) Int. Cl.
*A63F 13/35* (2014.01)
*A63F 13/537* (2014.01)
(52) U.S. Cl.
CPC ............ *A63F 13/35* (2014.09); *A63F 13/537* (2014.09)
(58) Field of Classification Search
None
See application file for complete search history.

(56) References Cited

U.S. PATENT DOCUMENTS

| | | |
|---|---|---|
| 2002/0183105 A1 | 12/2002 | Cannon et al. |
| 2006/0073882 A1 | 4/2006 | Rozkin et al. |
| 2008/0280674 A1 | 11/2008 | Sakuma |
| 2009/0093300 A1 | 4/2009 | Lutnick et al. |
| 2010/0113162 A1 | 5/2010 | Vemuri et al. |

(Continued)

FOREIGN PATENT DOCUMENTS

WO 2011109454 A1 9/2011

OTHER PUBLICATIONS

International Search Report and Written Opinion dated May 10, 2022 issued in International Application No. PCT/GB2022/050448 (10 pages).

*Primary Examiner* — Ronald Laneau
(74) *Attorney, Agent, or Firm* — Fox Rothschild LLP

(57) ABSTRACT

There is disclosed a multi-player game system for allowing a user to play a repeatable game of chance in a competitive context against at least one competitor, the game system comprising: a client device (410) operable by the user, providing a user interface module which is configured to display the state of a game of chance played by the user and to receive user input requesting a new result of the game of chance; a game engine (430, 432, 434), configured to provide a new result of the game of chance to the client device on receipt of a request from the client device (410) to provide the new result, where the system further comprises a multi-player engine (440), configured to: process multi-player game data representing a multi-player game that links a plurality of games of chance being played by a respective plurality of players on a respective plurality of client devices, said plurality of players consisting of said user and at least one competitor, and transmit to the client device (410) state data relating to the state of the plurality of games of chance, to allow the client device (410) additionally to display the state of said at least one competitor's games.

24 Claims, 13 Drawing Sheets

(56) References Cited

U.S. PATENT DOCUMENTS

| | | | |
|---|---|---|---|
| 2014/0135129 A1* | 5/2014 | Hussman | G07F 17/323 |
| | | | 463/31 |
| 2017/0021278 A1 | 1/2017 | Lee | |
| 2017/0200349 A1 | 7/2017 | Englman et al. | |
| 2020/0238170 A1* | 7/2020 | Alsaid | A63F 3/00643 |

* cited by examiner

MULTI-PLAYER GAME SYSTEM

FIELD OF THE INVENTION

The invention relates to a multi-player game system for allowing a user to play a repeatable game of chance in a competitive context against at least one competitor, and a corresponding method. The invention in particular provides a system architecture that more securely and more efficiently facilitates the playing of such a game.

BACKGROUND TO THE INVENTION

Many types of games can be played in a multi-player context, and have been for some time. Other types of games have conventionally been single player only, however. Games of chance, especially repeatable games of chance played for money (or otherwise) such as virtual slot machines, are examples of such games that have historically been single player only. This is in part due to the difficulty of extending or modifying the basic game mechanics into a multi-player context, and in part due to the potential for the game mechanics to be abused.

A typical system for playing a repeatable game of chance is shown in FIG. 1. The system 100 includes a client device 110, an Internet connection 120, and a game engine 130. Conventionally the client device 110 provides a user interface including display functions and user input (for example to receive clicks on a 'spin' button), and the game engine 130 handles all of the game logic, transmitting a precomputed game result to the client device 110 in response to an appropriate request (such as a 'spin' request). For security reasons, especially since such games may (but need not) include the ability to wager money on the outcome of each result of the game of chance, there is a strong technical prejudice within the art towards encapsulating all game functions as far as possible within a single secure server.

In order to increase interest in a game and to provide a more interesting experience overall, it may be desired to provide a multi-player context for a game of chance. However, no straightforward methods have previously existed for extending a game of chance into a multi-player experience without creating unsatisfactory game mechanics or unacceptable security breaches or potential for exploits.

The present invention seeks to address issues such as these in the prior art.

SUMMARY OF THE INVENTION

In a first aspect of the invention there is provided a multi-player game system for allowing a user to play a repeatable game of chance (such as a slots game) in a competitive context against at least one competitor, the game system comprising: a client device (such as a computer, laptop, mobile phone, tablet, smart watch, and so on) operable by the user, providing a user interface module which is configured to display the state of a game of chance played by the user and optionally to receive user input requesting a new result of the game of chance; a game engine (such as a slot engine provided by a games operator), configured to provide a new result of the game of chance (such as another spin result) to the client device on receipt of a request from the client device to provide the new result, wherein the system further comprises a multi-player engine, configured to: process multi-player game data representing a multi-player game that links a plurality of games of chance being played by a respective plurality of players on a respective plurality of client devices, said plurality of players consisting of said user and at least one competitor (and said plurality of client devices including the user's client device), and transmit to the client device state data relating to at least one aspect of the state of the plurality of games of chance, to allow the client device additionally to display at least one aspect of the state of said at least one competitor's games. The game engine and multi-player engine are preferably located in distinct locations to the client device, but in other aspects the functionality and physical embodiments may be combined as appropriate or necessary (the game engine and multi-player engine may be combined, for example, and elements of the systems may be combined with the client device, for example to allow temporary continuity in the event that a connection is lost; appropriate validation of results can in that case take place once the connection is restored, and so on).

The provision of a multi-player engine, separate to a game engine, which can communicate multi-player data directly to a client device, separate to a connection between the client device and game engine, can provide a number of advantages. Firstly, it provides a framework for providing a multi-player game based on an individual game of chance. Secondly, it allows more efficient use of the expensive and bandwidth-restricted connections between client devices and game engines. Thirdly, the separation of the less time critical multiplayer data from the more time- and loss-critical game result data allows different standards of connection to be provided where needed.

It was also discovered that it was only necessary to transmit at least one aspect of the state of the plurality of the games of chance, rather than necessarily all aspects of the state of the games. Typically the multiplayer data includes at least one of: player attributes (such as health and power attributes of any appropriate kind), player targets, attacks made between players, size of shared pot, and win multiplier, or any other appropriate state variables. The multi-player need not include the exact game result of every player's games (such as the state of a set of reels in a slots game, or every card in a dealt hand, or the value of every dice thrown, and so on), as explained more below, but doing so would be preferable (if possible and appropriate). This can reduce the amount of data needed to be transmitted over the connection between the multi-player engine and the player devices; what may not be an excess amount of data for one client device can easily become an excess amount of data for the multi-player engine to transmit multiple times to each device in turn.

Preferably the client device is configured to connect to the game engine by a first connection type, and to connect to the multi-player engine by a second connection type. The first connection type is preferably a connection-based protocol such as HTTP/S. The second connection type is preferably a connection-based protocol having event-driven responses to server queries, and more preferably uses the WebSocket protocol, but may use the HTTP/S or any other protocol. Preferably both the first and second connection type use the TCP protocol. Preferably the first connection type and/or second connection type are encrypted. The use of the WebSocket protocol in particular can perform relatively well in low bandwidth situations because (unlike HTTP/S) they don't have to transfer headers with every request, and has the further advantage that the multi-player engine can push data to the client device without the client having to initiate a request (via polling/long polling). Preferably the game engine communicates with the multi-player engine via a connection-based protocol, more preferably using the HTTP/S protocol. Preferably a connection between the client device and game engine is maintained for substantially all of the duration of the multi-player game, whereas preferably a connection between the client device and the game engine is created each time that a game result is requested. Preferably a connection is maintained also between the game engine and multi-player game engine for at least the duration of a multi-player game (the connection being associated with that game), or otherwise (for example an 'always on' connection to transfer data relating to more than one multi-player game).

The second connection type may be unidirectional from the multi-player engine to the client device, or may at least have a restricted bandwidth or connection speed or reliability, and so on (as before) in the direction from client device to multi-player engine. The first connection type is preferably bidirectional.

Preferably the game system has the features that: each result of the game of chance is associated with a round (which may be a spin of a slots game, for example), the multi-player engine is further configured to generate a round token associated uniquely with each round of the game of chance, and to transmit the round token to the client device, the client device is further configured to transmit the round token to the game engine with the request for a new result, the game engine is further configured to transmit a round token verification request to the multi-player engine, the multi-player engine is yet further configured to receive the round token verification request and to transmit a positive or negative verification result to the game engine, and the game engine is yet further configured to transmit the new result to the client device only if the verification result is positive. The multi-player engine is preferably configured to transmit a positive verification depending on whether the round token verification request corresponds to a round token transmitted to a client device. The multi-player engine need not know the client device which the request to validate the round token relates to, and further security can be provided by withholding this information. Preferably the multi-player engine maintains a list of issued round tokens and preferably marks as invalid or deletes a record of an issued round token once it has been verified. In the context of a slots game, the round token may be considered a spin token. Also preferably the round token verification request transmitted by the game engine also includes at least one representation of the game result (for example a spin result in a slots game), to reduce the number of transmissions required and amount of data sent between the game engine and multi-player engine. If the round token is not verified, the representation of the game result is discarded.

In response to the respective player indicating that they wish to join a multi-player game, preferably: the client device is configured to transmit a join request to the game engine, the game engine is configured, in response to receiving the join request, to transmit a ready request to the multi-player engine, the ready request including player data, the multi-player engine is configured, in response to receiving the ready request from the game engine, to generate a player token and to transmit the player token to the game engine, the game engine is further configured, in response to receiving the player token, to transmit the player token to the client device, the client device is further configured, in response to receiving the player token, to transmit a connection request to the multi-player engine, the connection request including the player token, and the multi-player engine is further configured, in response to receiving the connection request, to validate the player token and, if it is valid, to accept the requested connection.

Preferably both the round (or spin) tokens and player tokens are used simultaneously. Requiring the validation of two separate secrets (in a cryptographic sense) can increase the overall security of the system.

In one aspect, a plurality of types of games of chance may be selected, and the client device is configured to transmit a request to the game engine to select one said game of chance, wherein other players in the multi-player game may select a different said game of chance. This is a powerful feature which is enabled by the decoupling of the multi-player game components from the standardised single player games of chance run on the game engines.

In this aspect, each game of chance typically has a respective set of rules including at least one of: associated pay-out structure and minimum time between new results.

In this case, the multi-player engine may be configured to include only games with compatible sets of rules in the same multi-player game. Alternatively, the multi-player engine may be configured to normalise the results of each game in the multi-player game in dependence on their respective set of rules. Initially it was considered counterintuitive to combine games of chance having fundamentally different rules and properties.

The game system may further comprise at least one further game engine, in which case the client device may be configured to select one of the game engines, and to communicate with the selected game engine to initiate the game of chance on the selected game engine. In this case, other players in the multi-player game may select a different game engine.

Preferably the state data transmitted by the multi-player engine to each client device includes for each player: first game state data associated with the game of chance on the game engine, and second game state data extracted from the multi-player game data. The client device is preferably further configured to display the first game state data and second game state data in a unified form for each player. The division of this data into discrete parts can ensure that each element of the information can be delivered as soon as it is available, rather than needing to wait for all the game data to be updated and combined into a single data packet.

Preferably the first game state data as aforesaid includes at least one state selected from: a win, a loss, a win or loss, a win multiple, a representation of the game result, and any other state data relating to the game of chance, and may in some aspects also (or alternatively) be selected from: an amount won, a position of a reel, a game result, a set of positions of a set of reels, a player name, an amount wagered, and a game history. Other possibilities are of course possible as necessary and/or appropriate. Typically wagered or win amounts relating to other players are not transmitted to the client device (nor transmitted to the multi-player engine, ensuring privacy and reducing the amount of data required to be transmitted).

Preferably the second game state data includes at least one state selected from: an attribute of the player, a state related to attacks on other players, a selected attack mode, a selected defence mode, a state related to defending against attacks from other players, a list of players, in particular a list of players having a particular attribute, a ranking within the multi-player game, a history of interactions between at least two players, aggregated statistics relating to the game results of a plurality of the players, and a measure of health, mana, and/or power. Other possibilities are of course possible as necessary and/or appropriate. A health state preferably provides an indication of the degree to which a player is at risk of (or close to) elimination. A mana state (which can be known by many other names, such as magical energy, or simply energy, and so on) preferably provides an indication of a potential to take an action, or an amount of action points (or similar), or an energy result or potential of some sort, and may be depleted and optionally recharge, and typically is reduced by a given amount for a given action or type of action. A power state preferably provides an indication of the magnitude of effect of an action, or the magnitude of an energy effect or transfer, and so on. These states may be linked in any appropriate fashion. Thus, an action carried out by one player in respect of another player (or several other players) may diminish the first player's mana by a fixed amount, and reduce the other player's health by an amount dependent on the power, for example. Other names and types of state variable are of course possible.

The multi-player engine is preferably configured to process at least one state from the second game state data in dependence on at least one state from the first game state data. That is, the multi-player engine is preferably configured to modify at least one state from the second game state data in dependence on at least one state from the first game state data. Preferably the processing of at least one state from the second game state data comprises normalising the processing of said at least one state such that a consistent return-to-player (RTP) is provided for every player (for example, regardless of the game of chance played by each player). Put another way, preferably the multi-player engine is further configured to normalise the multi-player game data to provide a substantially consistent return-to-player (RTP) value for every player. These important features are preferably provided in independent form and/or in conjunction with the attributes mentioned below.

The game engine is preferably configured to transmit to the multi-player engine at least one of: an indication that another player won, and an indication of a win multiple for another player, and at least one of the multi-player engine and the client device is configured to determine a representation of a game result corresponding substantially to the indication that another player won or an indication of a win multiple, and to display the representation of a game result on the client device. The representation of a game result may encode a game result fully or only in part. This feature allows less data to be transmitted, while maintaining the illusion of providing full information regarding other games that are going on. A single float or integer, for example (depending on how accurately the win characteristics are approximated) will take up much less bandwidth than a set of data describing a full set of reel results. From the point of view of the user of the client device, it makes no difference what specific results actually occurred. In the event that the game result is reproduced in full, a player is typically only interested in the 'quality' of the win, and will not have much time to scrutinize each result in any case. It is also true that the amount of data presented can be potentially overwhelming for a player, and displaying a (partial) representation of the multiple game results can provide a simplified and therefore more usable user interface.

This feature is provided in independent form. Accordingly in another aspect of the invention there is provided a multi-player game system for allowing a user to play a repeatable game of chance in a competitive context against at least one competitor, the game system comprising: a client device operable by the user, providing a user interface module which is configured to display the state of a game of chance played by the user and to receive user input requesting a new result of the game of chance; a game engine, configured to accept a connection from the client device and to provide a new result of the game of chance to the client device on receipt of a request from the client device to provide the new result, wherein the system further comprises a multi-player engine, configured to: process multi-player game data representing a multi-player game that links a plurality of games of chance being played by a respective plurality of players on a respective plurality of client devices, said plurality of players consisting of said user and at least one competitor, and transmit to the client device at least one of: an indication that another player won, and an indication of a win multiple for another player, and wherein the client device is configured to process the indication that another player won or a win multiple, to generate a representation of a game result corresponding substantially to the indication, and to display the representation of the game result on the client device.

In this or any other relevant aspect, the game of chance may be associated with a grid having a plurality of grid locations (for example, the grid locations may correspond to individual symbols in a slots game), in which case the game result is defined by a subset of the grid locations, and determining a representation of a game result comprises generating a representation of the subset of the grid locations associated with the game result (as distinct from, for example, simply generating a representation of the game result as such, or a representation of the values corresponding to the grid locations). Thus, in a slots game, for example, the grid may be a 5×5 grid corresponding to the 5 individual symbols shown in each of the 5 reels (or any other sized grid depending on the layout of the slots). In this case, the game result may be a combination of lines of symbols, and the full game result would be encoded as a 5×5 array of symbols. In the present case, the representation of the game result would be an indication simply of which of the grid locations formed part of the win. Preferably the representation, in the case of slots, comprises a 5×5 (or other appropriately sized) array of Boolean values (true/false), encoding whether each location in the grid/array participated in the winning lines (or other shapes and/or combinations, and so on). Other encoding schemes (including run length encoding as an optional additional step, or any other compression scheme) are of course possible.

Thus, a single win indication or win multiple indication is converted at an appropriate point (either multi-player engine or client device or, in another aspect, the game engine) into a compact representation that conveys a sense of the magnitude of a win without having to encode the precise game result (or even a precise representation of a made up game result fitting the win multiple, as aforesaid). As a further refinement, the client device can assign arbitrary symbols to the representation to turn it back into an apparent full game result (in the case of slots, a full set of reels showing symbols), and so on. These related features also mean that the game engine does not need to know about any formats used by the multi-player engine or client device app to display multi-player result data, and only needs to supply a single win indication or (preferably) a win multiple indication. The win multiple indication may, as noted above, be a float or integer value, taking up a few bytes of bandwidth and memory at most. The preferred representation of the game result (in the context of slots) is a, say, 5×5 2D array of Boolean values, which amounts to 25 bits of data, which can be encoded comfortably using only 4 bytes of data. However, it is likely that in most cases, 256 different slot states could encode all necessary win multiples, at least to a reasonable degree of approximation, with a little redundancy to provide variations of patterns (other numbers of variations with particular relevance to data storage sizes, such as 16 variations, 4096 variations, 65536 variations, and so on, are of course possible). Thus a single byte of data could be used to encode each player's game result. By contrast, a full set of data encoding a 5×5 reel set may be more of the order of 25 bytes of data or more, depending on the number of distinct symbols and the efficiency of the encoding. Clearly this difference has a big impact on the bandwidth required.

The multi-player engine is preferably configured to transmit at least a portion of the multi-player game data to the game engine, for example on completion of the multi-player game, or whenever a player is knocked out. Essentially the data is preferably transmitted when any change happens in the multi-player game which is material to the functionality of the game engine.

The game engine is preferably configured to award at least one prize (monetary, money's worth, or otherwise) to at least one respective player in dependence on the multi-player game results. In an aspect where more than one game engine is provided (see below), a number of awards (which may be zero) is made, reflecting the fact that not all engines may have winning players.

The multi-player game data may comprise at least one attribute (such as health, mana, power, and so on) associated with each client device; and the multi-player engine may be further configured to modify at least one of said at least one attribute in response to a game result (such as a set of reels resulting from a slots spin) transmitted by the game engine meeting a predetermined criterion (such as a win condition, for example).

The multi-player game engine may be further configured to determine whether modified values of said at least one of said at least one attribute corresponds to a game loss condition (for example, a health attribute reaches zero) and, if so, determining the client device associated with said at least one of said at least one attribute to be eliminated from the multi-player game. Preferably elimination from the multi-player game comprises being removed from the list of players competing for a first place position. Preferably a player may continue to play their own game of chance, preferably while being able to spectate the remainder of the competition (that is, preferably remaining with the same user interface until the multi-player game is completed, with the possibility of exiting if desired). In this context, elimination from a multi-player game preferably connotes being assigned a finish position. Optionally a prize or share of a pot may be assigned to a player at that time or later (for example on completion of the multi-player game) based on the finish position. That is, being eliminated does not necessarily entail missing out on any prize allocation. Optionally a prize allocation may be made once the number of players has reached a threshold amount which may be more than one. In that case, a final ranking of the players may be made by any appropriate scheme, such as ranking average win multiple, highest win multiple, number of winning game results, and so on (or any appropriate combination of sorting).

In another aspect of the invention there is provided a multi-player game system for allowing a user to play a repeatable game of chance in a competitive context against at least one competitor, the game system comprising: a plurality of client devices, each being provided with computer program code which, when executed by a processor in the client device causes the client device to: provide an interface to allow a respective user of the client device to play a respective game of chance, and to display a result of the game of chance; receive multi-player result data relating to at least one other user playing at least one other respective game of chance, the multi-player result data including at least one respective indication of at least one of: a win, a win amount and a win multiple relating to said at least one other respective game of chance; process the multi-player result data to determine at least one game result corresponding substantially to said at least one indication; and display said at least one game result in combination with the displayed result of the game of chance.

Said at least one other game of chance may be different to the game of chance played by the user of the client device, and wherein said determined at least one game result may relate to the game of chance played by the user of the client device. That is, a winning result in a different game (played by an opponent) may in at least some cases be translated into a winning result in the same game as currently being played by the user. In this case, winning result is, for example, a representative result in the current game that corresponds to the necessary win multiple. This can assist in rapid visualisation of the result.

In a further aspect of the invention, there is provided a multi-player game system for allowing a user to play a repeatable game of chance in a competitive context against at least one competitor, the game system comprising: at least one game server, being provided with computer program code which, when executed by at least one processor in said at least one game server, causes said at least one game server to: repeatably compute a result of the game of chance in response to a request from a client device operated by the user; and allocate a prize to the user if the game result is a win; a plurality of client devices, each being provided with computer program code which, when executed by a processor in the client device causes the client device to: communicate with said at least one game server to request said result of the game of chance; receive each result of the game of chance; and display the result of the game of chance, wherein said at least one game server is further caused to: store multi-player game data representing a multi-player game being played between users of said plurality of client devices, said multi-player game data comprising at least one attribute associated with each client device; and modify at least one of said at least one attribute if the game result is a win. Allocating a prize preferably comprises modifying financial data to reflect a change in amounts associated with a player or client device.

The plurality of client devices may be further configured to receive at least one further result of at least one respective further game of chance associated with at least one other of said plurality of client devices; and to cause said at least one further result to be displayed in combination with the result of said game of chance.

Furthermore, preferably if a player wins the game of chance, said at least one game server is configured to do at least one of: improve the respective attribute of the player, and worsen the respective attribute of at least one other player. The attributes may be improved and/or worsened in accordance with a ratio or other quantitative relationship selected by the player.

Said at least one other player is preferably selected in accordance with a predefined player selection rule, and preferably the player selection rule is selected by the player, preferably from at least one of: other players who have attacked the player, players with a most favourable attribute value, players with a least favourable attribute value, and randomised. In another aspect, the game may support a manual selection of target at any appropriate time, if this feature is enabled.

Said at least one game server is preferably configured such that if an attribute associated with a player reaches a threshold amount, the player is considered eligible to be eliminated from the multi-player game. In this case, in some aspects, said at least one game server is configured such that if a player achieves a winning result in their respective game of chance, the player is no longer considered eligible to be eliminated from the multi-player game. Otherwise, once a player is deemed eligible to be eliminated, the player is eliminated.

In a yet further aspect of the invention, there is provided a method of allowing a user to play a repeatable game of chance in a competitive context against at least one competitor, the method comprising: at a client device, displaying the state of a game of chance played by the user and receiving user input requesting a new result of the game of chance; at a game engine, accepting a connection from the client device and providing a new result of the game of chance to the client device on receipt of a request from the client device to provide the new result, wherein the system further comprises a multi-player engine, and the method further comprises: at the multi-player engine, processing multi-player game data representing a multi-player game that links a plurality of games of chance being played by a respective plurality of players on a respective plurality of client devices, said plurality of players consisting of said user and at least one competitor, and transmitting to the client device state data relating to at least one aspect of the state of the plurality of games of chance, to allow the client device additionally to display at least one aspect of the state of said at least one competitor's games.

In another aspect of the invention, there is provided a method of providing a multi-player game based on a repeatable game of chance, the method comprising: providing a plurality of games of chance to a respective plurality of players; and for each player: displaying at least one aspect of the state of the respective game of chance; transmitting a request from the player for a new result of the respective game of chance; receiving via a first connection the new result of the respective game of chance; receiving via a second connection multi-player data including to at least one aspect of the state of at least one other of the plurality of games of chance; and displaying at least one aspect of the state of said at least one other of the plurality of games of chance.

The method may further comprise modifying the state of at least one other of the plurality of games of chance in response to transmitting the request for a new result of the respective game of chance. This is preferably done when a win condition is determined in relation to the game result. For example, a measure of player health or the like may be modified (preferably diminished) in the event of a player winning.

In a further aspect of the invention, there is provided a method of causing a result of a game of chance to be displayed on a client device, comprising: receiving result data relating to the outcome of a game of chance on which an amount was wagered, the result data comprising an indication of at least one of: a win, a win amount and a win multiple relating to said outcome; processing the result data to select a game result that corresponds at least approximately to the indication of a win, win amount or win multiple; and displaying the game result on the client device.

In another aspect of the invention, there is provided a method of allowing a user to play a repeatable game of chance in a competitive context against at least one competitor, the method comprising: repeatably computing a result of the game of chance in response to a request from a user; making a determination of whether the game result is a win condition; processing multi-player game data representing a multi-player game being played between a plurality of players including the user and said at least one competitor, the multi-player game data including at least one attribute associated with each respective player; and modifying at least one of said at least one attribute (preferably associated with a player other than the user) if the game result is determined to be a win condition.

The method may further comprise determining whether modified attributes correspond to a game loss condition and, if so, determining the associated player to be eliminated from the multi-player game. Preferably the method further comprises other aspects as aforesaid, including (and especially) the feature of transmitting state data to each client device, the state data including for each player: first game state data associated with the game of chance on the game engine, and second game state data extracted from the multi-player game data, and all related features. For example, preferably the method comprises processing at least one state from the second game state data to modify it in dependence on at least one state from the first game state data, in particular preferably further comprising the step of normalising the multi-player game data to provide a substantially consistent return-to-player (RTP) value for every player.

In a final aspect of the invention, there is provided computer program code, tangibly embodied on a computer readable medium, which, when executed by at least one processor in a computer, causes the computer to carry out a method as aforesaid.

Although the embodiments of the invention described herein with reference to the drawings may comprise computer-related methods or apparatus, the invention may also extend to program instructions, particularly program instructions on or in a carrier, adapted for carrying out related processes of the invention or for causing a computer to perform as a controlling apparatus in relation to the invention. Programs may be in the form of source code, object code, a code intermediate source, such as in partially compiled form, or any other form suitable for use in the implementation of the processes according to the invention. The carrier may be any entity or device capable of carrying the program instructions.

For example, the carrier may comprise a storage medium, such as a ROM, for example a CD ROM or a semiconductor ROM, or a magnetic recording medium, for example a floppy disc, hard disc, or flash memory, optical memory, and so on. Further, the carrier may be a transmissible carrier such as an electrical or optical signal which may be conveyed via electrical or optical cable or by radio or other means. When a program is embodied in a signal which may be conveyed directly by cable, the carrier may be constituted by such cable or other device or means.

Although various aspects and embodiments of the present invention have been described separately above, any of the aspects and features of the present invention can be used in conjunction with any other aspect, embodiment or feature where appropriate. For example apparatus features may where appropriate be interchanged with method features. References to single entities should, where appropriate, be considered generally applicable to multiple entities and vice versa. Unless otherwise stated herein, no feature described herein should be considered to be incompatible with any other, unless such a combination is clearly and inherently incompatible. Accordingly, it should generally be envisaged that each and every separate feature disclosed in the introduction, description and drawings is combinable in any appropriate way with any other unless (as noted above) explicitly or clearly incompatible.

DESCRIPTION OF THE DRAWINGS

An example embodiment of the present invention will now be illustrated with reference to the following figures in which.

DETAILED DESCRIPTION OF AN EXAMPLE EMBODIMENT

Figure 1:
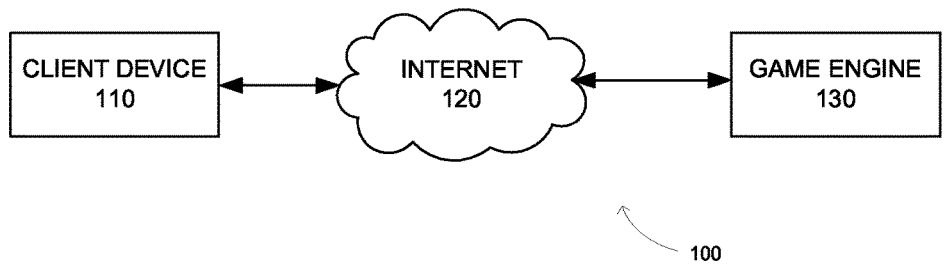
FIG. 1 is an overview of a conventional game system including a client device and game engine.

A multi-player game system for allowing a user to play a repeatable game of chance in a competitive context against at least one competitor will now be described, in effect extending the single player game system shown in FIG. 1 into a multi-player domain.

Figure 2:
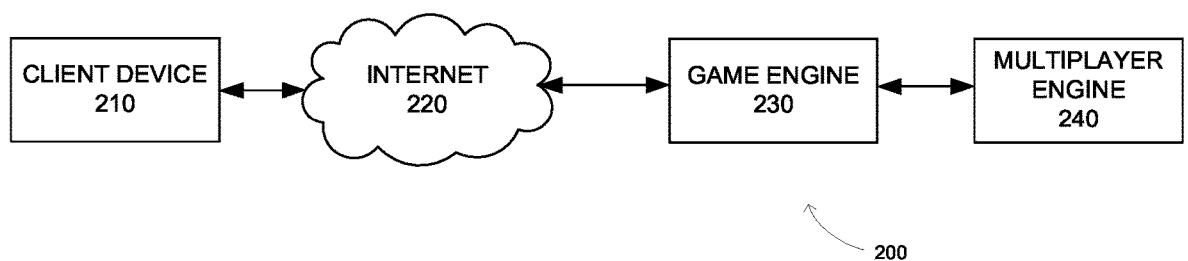
FIG. 2 is an overview of a game system including a client device, game engine and multi-player engine.

FIG. 2 is an overview of a game system including a client device, game engine and multi-player engine. The system 200 includes a client device 210, an Internet connection 220, a game engine 230 and a multi-player engine 240, which is shown as separate to the game engine 230 but in some variants forms a part of a single server system including both features. In the present embodiment, the game engine 230 provides a variety of slot games which provide repeated outcomes based on chance in response to the user of the client device clicking on a button to select (or otherwise selecting) a new spin of the slots.

In this first embodiment, the multi-player engine processes the results of the game engine to determine at least one statistic relating to the performance of each of the players using the particular slots game. The statistics may alternatively or additionally be computed by the game engine. In the present embodiment, players are ranked by win sizes, but in variants are ranked by win percentage, length of runs of wins, luckiest spin, best spin, and so on. The ranking is carried out substantially in real-time, for example on a regular basis or after each spin carried out by the user (or any player), so that the user can see how they are performing relative to a group of players. In real money versions of the game (or otherwise), prizes may be awarded at the end of a defined period, a number of spins, or at the end of a multi-player game defined by any appropriate means. Prizes are normally given based on final player rankings. This form of multi-player game is relatively easy to create and administer, but does not involve any direct interaction between different players.

Figure 3:
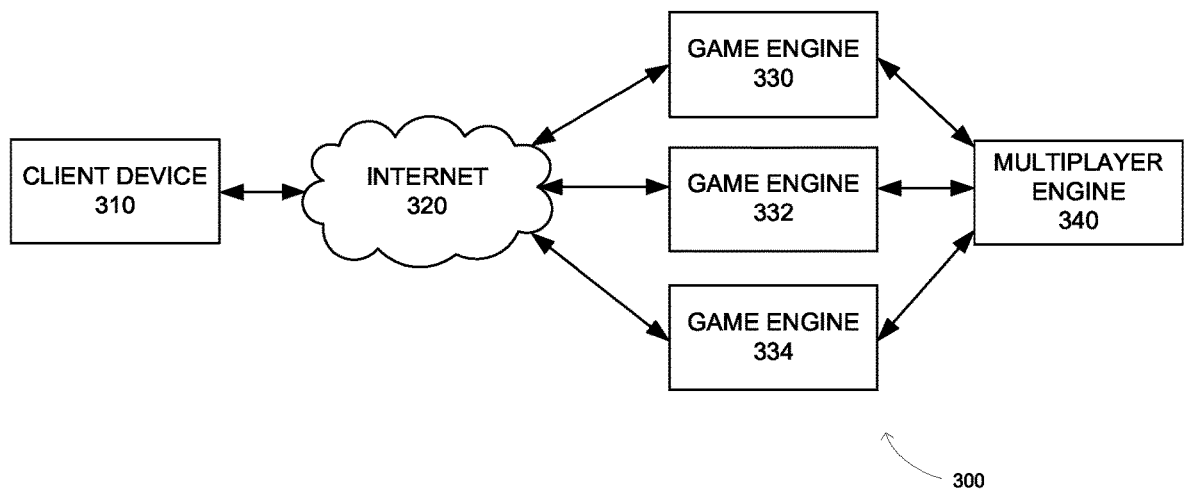
FIG. 3 is an overview of a game system extended from the system of FIG. 2 to include multiple game engines.

FIG. 3 is an overview of a game system extended from the system of FIG. 2 to include multiple game engines. The system 300 includes a client device 310, an Internet connection 320, a number of game engines 330, 332, 334, and a multi-player engine 340 as before.

In this second embodiment, the multi-player engine is provided separately, and provides essentially the same function as described in relation to FIG. 2, but to multiple game providers at once. Thus, players can compete in the same way as described above within a single game type. Multiple game types can be provided also within any single game engine, and it will be appreciated that this may be true for any other game engines mentioned herein (unless inappropriate or impossible).

In a third embodiment, also based on FIG. 3, the multi-player engine provides the ranking system again, but for each of the game engines simultaneously. This requires that the games and the game engines be normalised appropriately, for example having the same spin duration (if the multi-player game is decided by length of time) and the same payout or win formulas, for example. In some cases, the results of games are normalised rather than the games themselves. By allowing the results of multiple games to be combined in a single game (or multi-player game), a greater number of players can compete together and/or a more steady stream of games can be created, meaning that waiting periods can be decreased.

In the preceding embodiments, all game-related communications from the client pass through a single interface of the, or each, game engine. This helps to maintain security.

Figure 4:
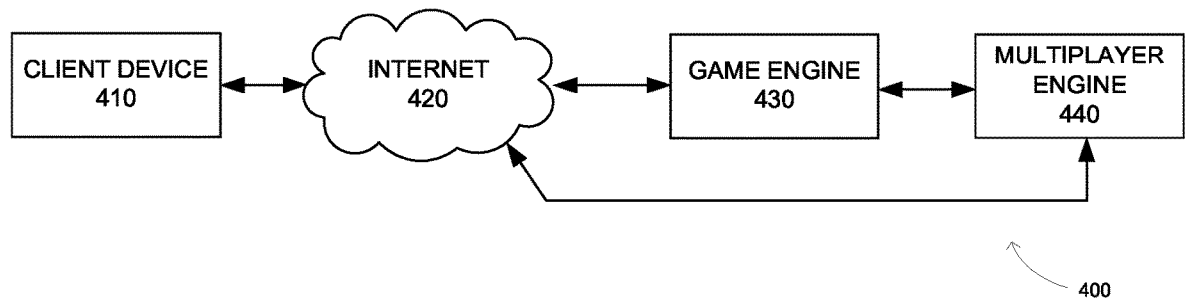
FIG. 4 is an overview of a game system extended from the system of FIG. 3.

FIG. 4 is an overview of a game system extended from the system of FIG. 3. A client device 410 connects via the Internet 420 to a game engine 430, which in turn communicates with a multi-player engine 440. An additional line of communication exists between the multi-player engine 440 and the client device 410 (via the Internet 420).

Figure 5:
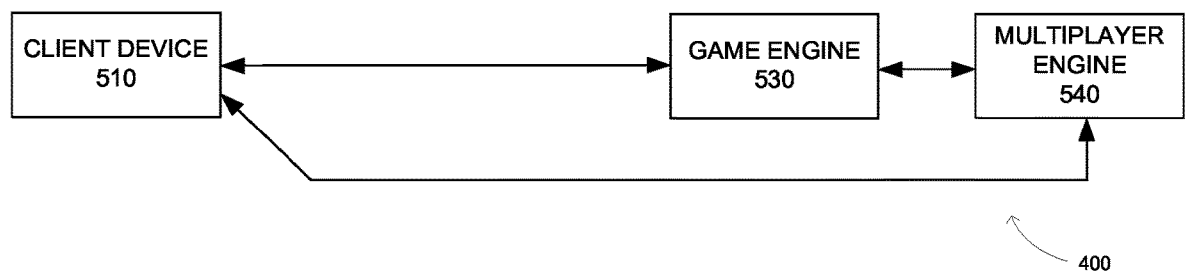
FIG. 5 is an alternative overview of the game system of FIG. 4.

FIG. 5 is an alternative overview of the game system of FIG. 4. For ease of reference, only the system devices are shown, allowing the interconnections between them to be more easily visualised. In FIG. 5, as before, the system 500 includes a client device 510, a game engine 530, and a multi-player engine 540.

In a fourth embodiment as shown in FIGS. 4 and 5, an additional channel of communication extends between the multi-player engine 540 and the client device 510. The multi-player engine 540 communicates multi-player game data via this additional connection. The multi-player game data comprises information on the state of all of the players (preferably including the user), for example battle data containing statistics and rankings for all players. The data transmitted via the connection is not typically security sensitive. This additional channel reduces the amount of data that needs to be transmitted between the client device 510 and the game engine 530, which can reduce the load on the game engine(s). There is little scope to change the connection between client devices 510 and engine 530, because of standardization and because of the need to provide a high quality, secure, always-on connection that may furthermore be metered by data amount. This is especially true for games of chance with a financial outcome, because security and avoiding data loss (and therefore financial loss) are critical. Both WebSockets and HTTP/S use TLS encryption, but it is advantageous to send inessential data via a separate backchannel to reduce the demand on the mission-critical connection between the client device 510 and game engine 530.

Figure 6:
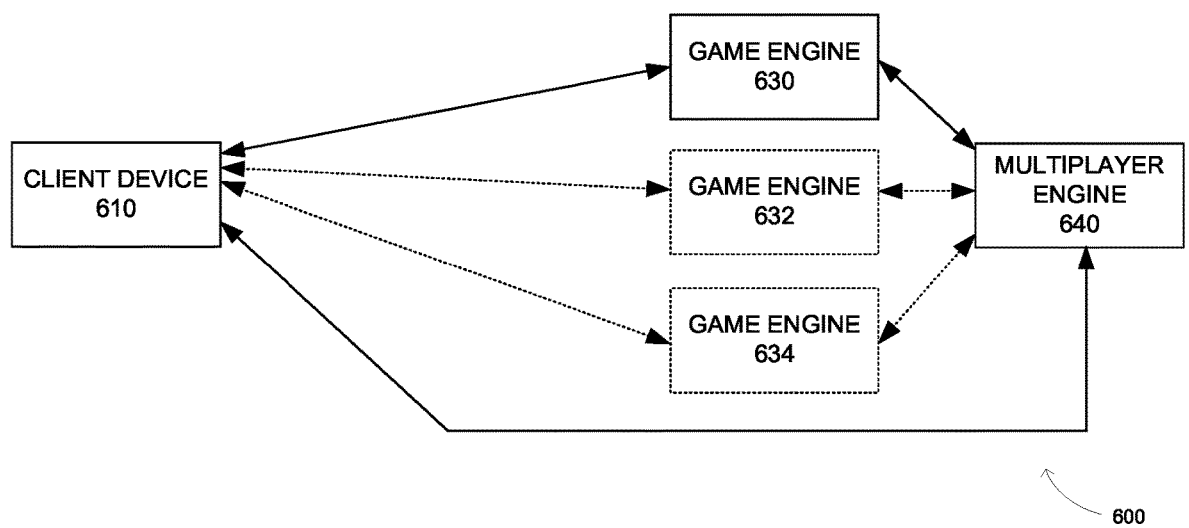
FIG. 6 is an overview of an extended version of the game system of FIG. 5.

FIG. 6 is an overview of an extended version of the game system of FIG. 5, showing multiple game engines. In the system 600, as before, a client device 610 is operable to communicate with any one (or multiple instances) of the game engines 630, 632, 634. A connection with the first game engine 630 is shown in the figure, with the other optional connections indicated with a dashed line. A multi-player engine 640 is able to communicate with all of the game engines 630, 632, 634.

In a fifth embodiment, also as shown in FIGS. 4 to 6, a different type of game is provided using the same basic system architecture, providing a greater degree of interaction and synchronicity between the players in the multi-player game. This embodiment, and the new game type, will be described in more detail below.

Figure 7:
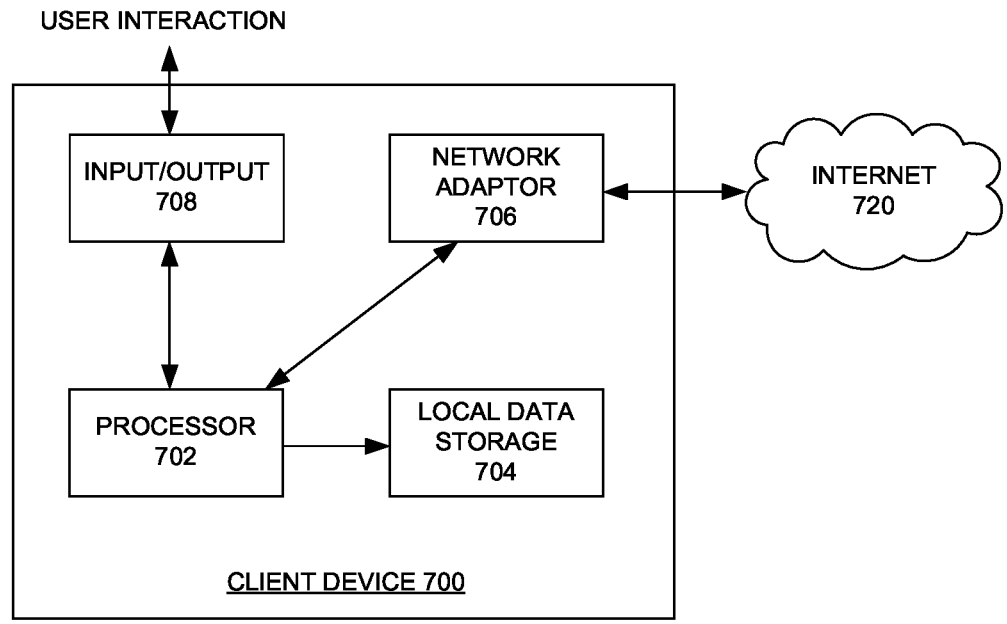
FIG. 7 is a schematic of a client device of any of the systems of FIGS. 2 to 6.

FIG. 7 is a schematic of a client device of any of the systems of FIGS. 2 to 6. The device 500 typically includes a processor 502, local data storage 504 include computer program code to run on the processor 502, and in particular including computer program code encoding the user interface for display the game results and for receiving the user inputs for transmission to the game engine(s). The device 500 also includes a network adaptor 506, connectable to the Internet 520, and an input/output module 508. Any appropriate client device may be provided (such as a mobile phone, tablet, computer, laptop, smart watch, and so on) so these details may vary as appropriate.

Figure 8:
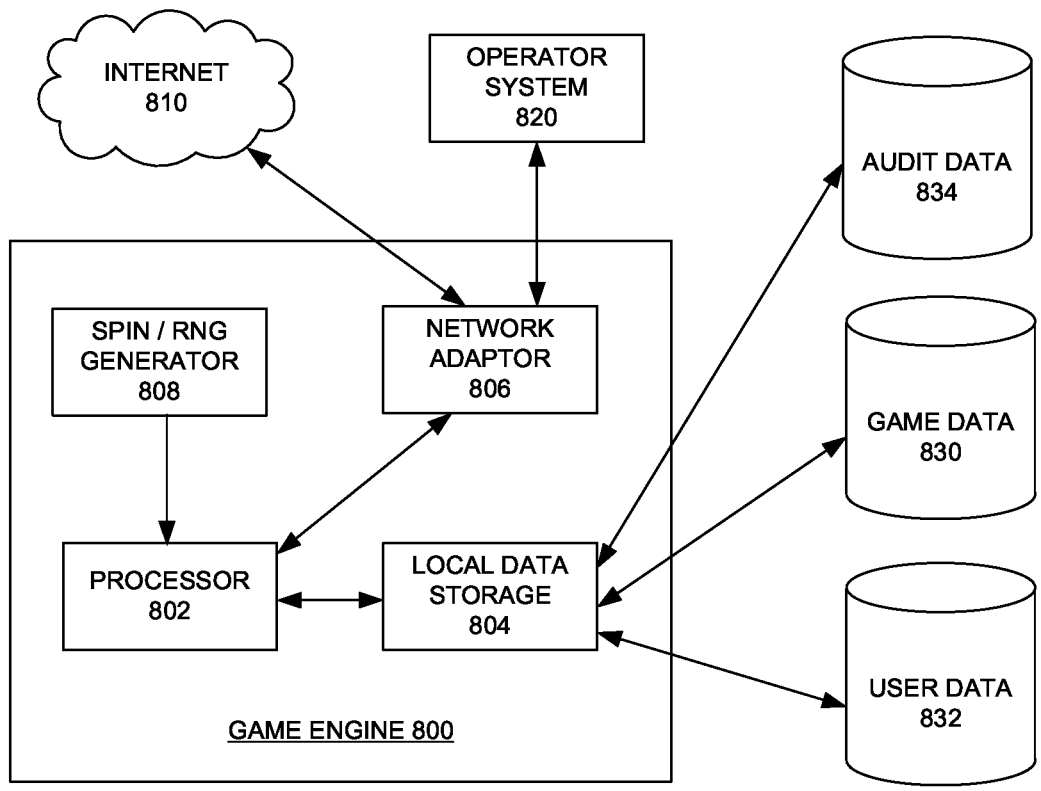
FIG. 8 is a schematic of a game engine of any of the systems of FIGS. 2 to 6.

FIG. 8 is a schematic of a game engine of any of the systems of FIGS. 2 to 6. A game engine 800 is shown, including at least one processor 802, local data storage 804, at least one network adaptor 806, and a spin/random number generator module 808. The network adaptor 806 is able to communicate with the Internet 810, and in turn with client devices of any appropriate type, and also with an operator system 820 that includes a payment interface for handling financial transactions (if appropriate) relating to games of chance provided by the game server 800. The payment elements may be omitted entirely if appropriate (for example if the games are not played for real money). The local data storage module 804 is able to access game data 830, which includes data relating to the state of each game being played, including identifiers and other appropriate data relating to players involved in each game. The local data storage 804 also includes user data 832, for example including a plurality of user accounts corresponding to a respective plurality of users. The user accounts may include game preferences, game history, financial details, payment preferences, contact details, and so on, encrypted with an appropriate high level of encryption. The local data storage 806 also includes audit data 834, for example to comply with relevant laws, and any other data that is appropriate or necessary in order for the game engine 800 to function as intended.

It will be appreciated that any or indeed all of the above-mentioned components of the game engine may be provided in any appropriate physical or virtual form, for example using a rack mounted server, distributed at least partly in the cloud, a virtual machine, in the form of multiple servers or general purpose computers, or any appropriate combination of the above.

Typically a game engine is associated with a game developer, and may typically include or otherwise be able to provide a plurality of types of game to clients. Typically the multi-player engine is associated with the same game developer, but need not be. Typically the game engine is able to provide (for example in the form of an app or website) a user selectable list of games. An operator website (not shown) may also or alternatively include a similar list of games, for example in accordance with a license between the operator and the game developer to allow the operator to provide and/or rebrand the games for their users. There may be a plurality of operator websites or apps offering the game developer's game via the game engine. Other arrangements are of course possible, and do not in any event materially affect the technical operation of the games on the game engine and multi-player engine. If a player client selects a game on an operator website or app, either the client is redirected to the appropriate interface of the game engine (typically for mobile devices), or the game engine content is displayed inside an iframe element on the operator website (typically for desktop devices).

Typically the games are provided by game developers, and the game engine 800 may be operable to communicate with other game developer systems (not shown) in order to delegate the operation and internal logic of the games to remote servers. In the present embodiments, the game engine 800 communicates with other game developer systems and/or the multi-player engine (not shown) via the network adaptor(s) 806, but other methods of communication (including communicating locally with a local system) are of course possible.

Figure 9:
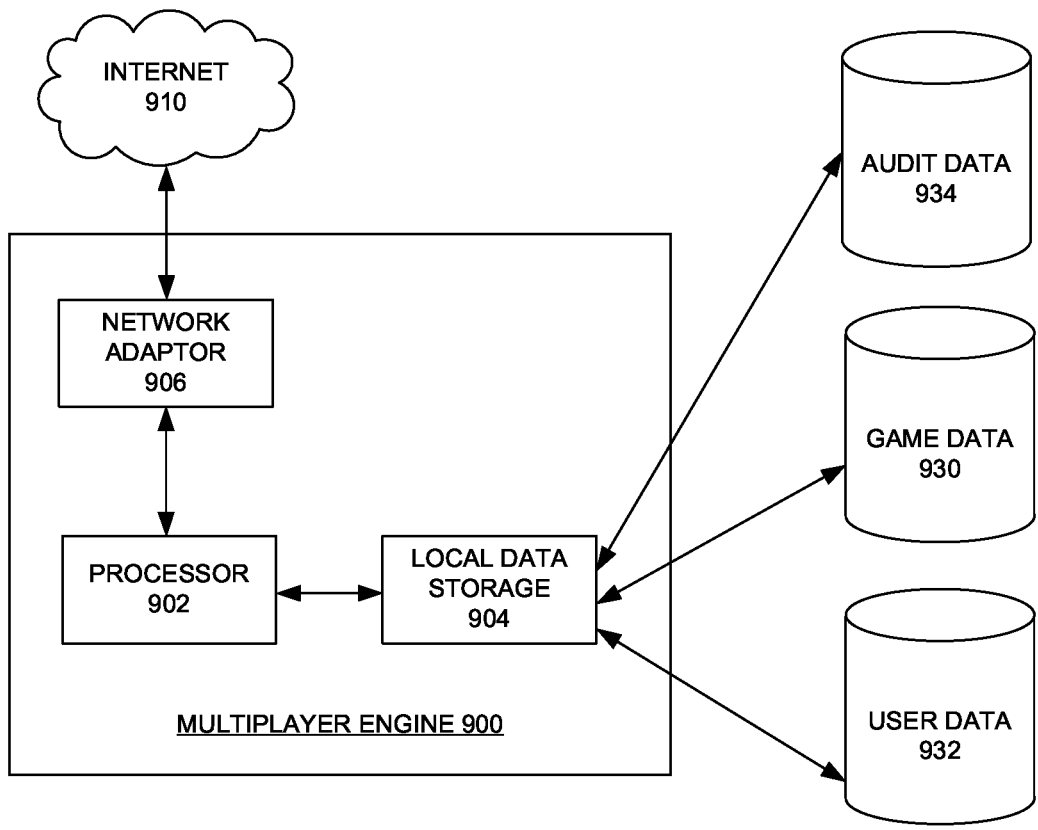
FIG. 9 is a schematic of a multi-player engine of any of the systems of FIGS. 2 to 6.

FIG. 9 is a schematic of a multi-player engine of any of the systems of FIGS. 2 to 6. The multi-player engine 900 includes at least one processor 902, local data storage 904 and a network adaptor 906, operating in similar ways to the corresponding features of the game engine of FIG. 8. The network adaptor 906 is operable to communicate via the Internet 910 (or via a dedicated communications link or otherwise, for mission critical communications) with game servers and client devices (not shown). The local data storage includes game data 930, user data 932 and audit data 934 which are used in substantially similar ways to the data shown in FIG. 8. The game data includes multi-player game states, including lists of players, and state information regarding each player in the game, for example relating to time since last spin, generated spin tokens, player identifiers, spin histories, and so on.

Figure 10:
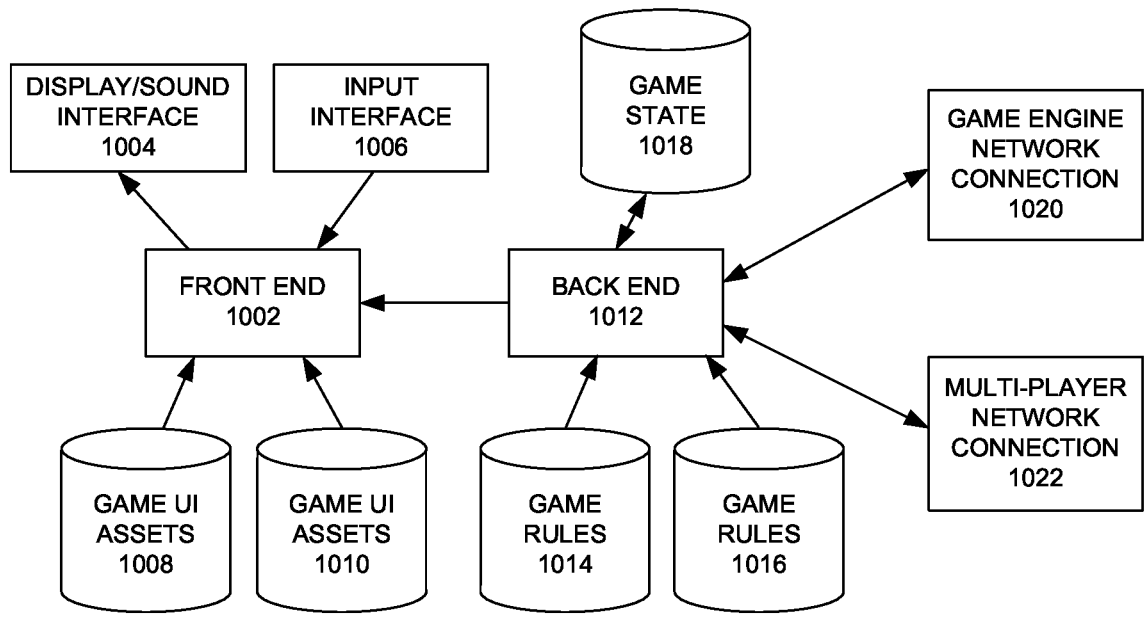
FIG. 10 is a software architecture overview of the client device of FIG. 7.

FIG. 10 is a software architecture overview of the client device of FIG. 7. The system architecture includes a front end component 1002 and a back end component 1012. The front end 1002 communicates with a display interface and/or sound interface 1004 for outputting graphics and sound relating to a game being run, and also communicates with an input interface 1006 for receiving mouse clicks, finger taps, key presses, finger gestures, and so on, which can provide instructions relating to the current game. The front end 1002 also has access to game UI assets 1008, 1010, providing a unique set of icons, sounds and other user interface assets relating to each game installed on the device. The game UI assets 1008, 1010 may be installed in advance or may be downloaded as needed from the game engine or game developer system (for example), or any appropriate combination of the above.

The back end 1012, meanwhile, maintains an appropriate game state 1018, and mediates between the game engine (not shown) and the front end 1002 using an appropriate set of game rules 1014, 1016 which are selected in dependence on the currently selected game. The game engine is the authority as regards the conduct of the game, and the game rules 1014, 1016 exist principally to avoid sending invalid user inputs to the game engine that would be disregarded by the game engine in any event. The back end communicates with the game engine (not shown) via a game engine network connection 1020 (which is typically an HTTP/S connection), for example to transmit spin requests to game engines, and communicates via an 'out of band' connection with the multi-player engine via the multi-player engine network connection 1022 (which is typically a WebSocket API, or HTTP/S connection or any other connection-based or connectionless protocol), to receive supplementary spin data and multi-player game state data from the multi-player engine.

In the preferred embodiment, the Amazon AWS system is used to communicate spin requests and other requests to the game engines associated with game operators, using custom serverless functions transmitted via a web socket connection API gateway. The HTTP/S (or other type of) connection with the game engine is typically opened and closed for each spin request, but the connection protocol may differ by different game engine in some cases. The WebSocket (or other) connection with the multi-player engine is opened at the start of the multi-player game session and is kept open until the end of the multi-player game session. This can maintain the integrity of the game without repeated re-authentications, and can minimise the amount of header data that needs to be sent between the client device and multi-player engine. The above-mentioned serverless functions run on demand on servers at the Amazon AWS system, and the AWS API gateway maintains the WebSocket connections with the clients. The serverless functions send requests to the API gateway which are then forwarded on to the clients using their WebSocket connections. The Redis cache runs on a server at AWS and is accessible by the serverless functions. Other protocols and software architectures are of course possible, as circumstances dictate.

Figure 11:
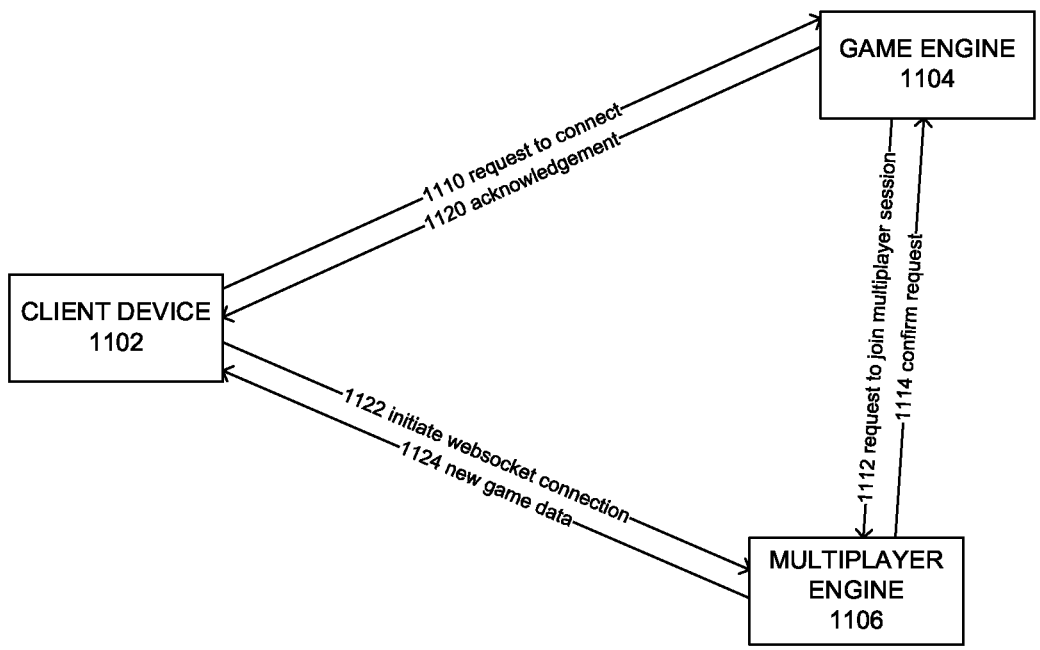
FIG. 11 is a sequence diagram showing the initiation of a new game in the system of FIG. 4.

FIG. 11 is a sequence diagram showing the initiation of a new game in the system of FIG. 4. A client device 1102, game engine 1104 and multi-player engine 1106 are shown, as before. In a first step, a request 1110 to connect to a multi-player game is transmitted from the client device 1102 to the game engine 1104. The game engine sends a request 1112 to join a multi-player session to the multi-player engine 1106. The request 1112 includes relevant player data, including a user ID and game name. If a session is open or can be created, the multi-player engine responds with a confirmation 1114 of the request. The confirmation 1114 includes a unique player token that is generated for the player based on the player data included in the request 1112.

On receipt of the confirmation 1114, the game engine 1104 transmits an acknowledgement 1120 back to the client device 1102 to indicate that the player is accepted into the multi-player game. The acknowledgement 1120 includes the unique player token, which at this point is known only to that specific client device (as well as the game engine and multi-player engine). The client device then send a request 1122 to the multi-player engine to initiate a WebSocket connection, the request including the player token generated originally by the multi-player engine. The multi-player engine authenticates the player token and opens the WebSocket connection. New game data is then sent 1124 to the client device via the newly opened WebSocket connection, which remains open for the duration of the multi-player game.

As mentioned above, the connection between the client device and the multi-player engine 1106 is a WebSocket connection, and the connection between the client device and the game engine 1104 is an HTTP/S connection, though other connection types are possible. Using the second connection to transfer significantly larger chunks of gameplay data thus can provide considerable efficiency by reducing the amount of bandwidth required for the mission-critical connection between client device and game engine.

The new game data 1124 includes the following data:

TABLE 1

Content of new game data transmitted to client device by multi-player engine

| Data | Notes |
| --- | --- |
| Game ID | Unique identifier for multiplayer game instance |
| Number of players | Number of players participating (2 to 99) |
| Player information | Includes 'hero' avatar selected by player |
| Round token (also known as spin token) | Unique identifier associated with a particular outcome of the game of chance hosted by the game engine. One is created and validated for each spin of a slots game, or roll of the dice, or deal of cards, and so on. |

The game data 1124 need not be transmitted simultaneously. Queue updates (the transmission of game data) happen whenever the state of the queue changes, and the Round token (or spin token) is sent when a new multiplayer game begins. None of the rows in the table above are essential, and any combination of one or more of the data types may be used. When a new multi-player game begins, the initial game state (IDs, health and so on of all players in the game) is transmitted also.

The round token (or 'spin token') has an associated time stamp which is the first time that the round token can be used. This allows enforcement of a minimum time between rounds (or spins), for example to comply with local laws.

It will be appreciated that the use of the additional communication channel between the multi-player engine and the client device(s) means that data flows between client device and game engine remain substantially unaltered in the new multi-player game mode. This not only helps minimise cost but also avoids the need for extensive (or indeed any) reconfiguration of game engines to accommodate the new game mode(s).

Figure 12:
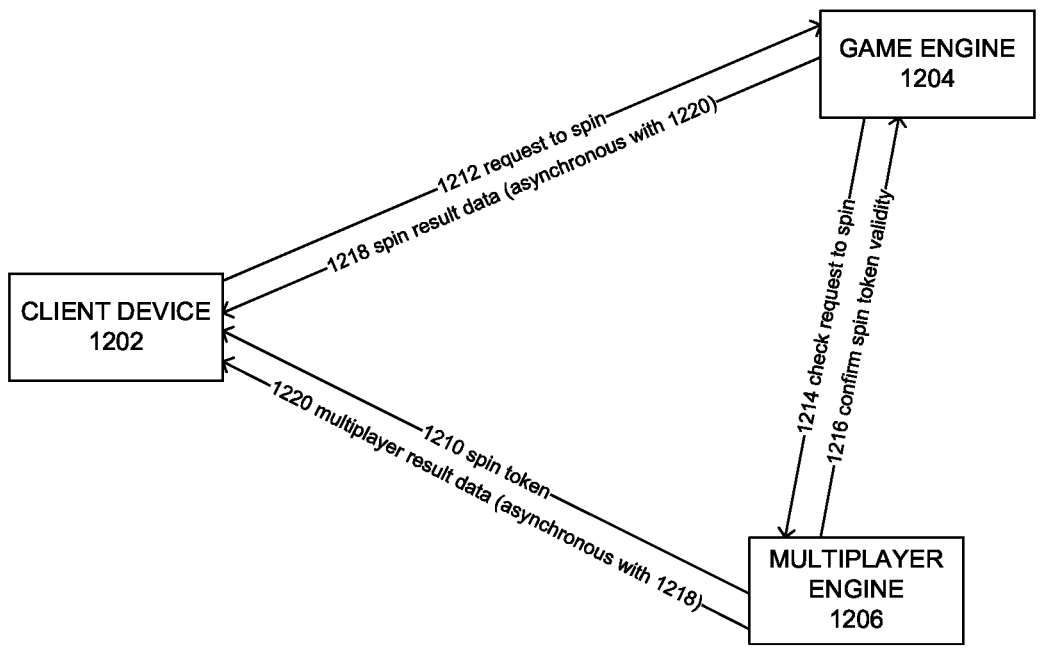
FIG. 12 is a sequence diagram showing a typical game round in the system of FIG. 4.

FIG. 12 is a sequence diagram showing a typical game round in the system of FIG. 4. It is assumed that the game has been initiated in accordance with the process shown in FIG. 11.

The client device 1202, game engine 1204 and multi-player engine 1206 interact again. At the beginning of a round, a new spin token 1210 is transmitted from the multi-player engine to the client device 1202. When the user requests a spin (or otherwise indicates that the next round should commence), the client device 1202 transmits a spin request 1212 to the game engine 1204. The request 1212 includes the unique spin token transmitted to the client device 1202 by the multi-player engine 1206. The game engine 1204 sends a request 1214 to the multi-player engine 1206 to confirm the validity of the spin token supplied by the client device 1202. If the spin token is valid, a message 1216 is transmitted from the multi-player engine 1206 to the game engine 1204 to confirm this. The game engine then calculates the next result value (using the spin processor/random number generator) and transmits the spin result data 1218 to the client device 1202. In the interest of efficiency, a copy of the spin result data is transmitted by the game engine in the request 1214 for verification of the spin token. The spin result data informs the multi-player engine of the outcome of the spin. The spin result data does not include absolute wagered or win amounts, but does include win multiple information. If the spin token is deemed invalid, the game engine just voids the spin, and the multi-player engine also disregards the spin data.

The multi-player engine 1206 is tracking the spin results and game states of all of the client devices (and associated players) in each multi-player game session, and periodically transmits this data to each client device in the form of multi-player result data 1222. The data packets 1218 and 1222 may arrive in any order. The client device follows rules, explained below, dictating how and when to update the information displayed to the user to take into account the asynchronous nature of the data. Typically the multi-player result data 1222 is transmitted periodically. A target refresh rate is every 100 ms (which can of course be higher or lower as appropriate) but if no data has changed, no refresh is sent. The result data 122 may be transmitted additionally or alternatively in response to certain events, such as a certain number of players changing state (sending the data after every single player changes state would be too onerous and bandwidth-consuming), or a combination of the two (for example transmitting the result data 1222 every x seconds or after y games have produced a result, whichever is the sooner, and so on).

In the present embodiment, the multi-player result data 1222 includes: the health, power and targets of each player, attacks made, a simplified representation of each player's slot game, and game statistics such as the size of the PvP (shared) pot. The result data 1222 also includes additional information about the player's own game, including win multiplier and spin (round) token. More specific information about the player's own game, such as reel positions and individual win lines, is transmitted by the game engine to the client device, as in normal single player games.

Figure 13:
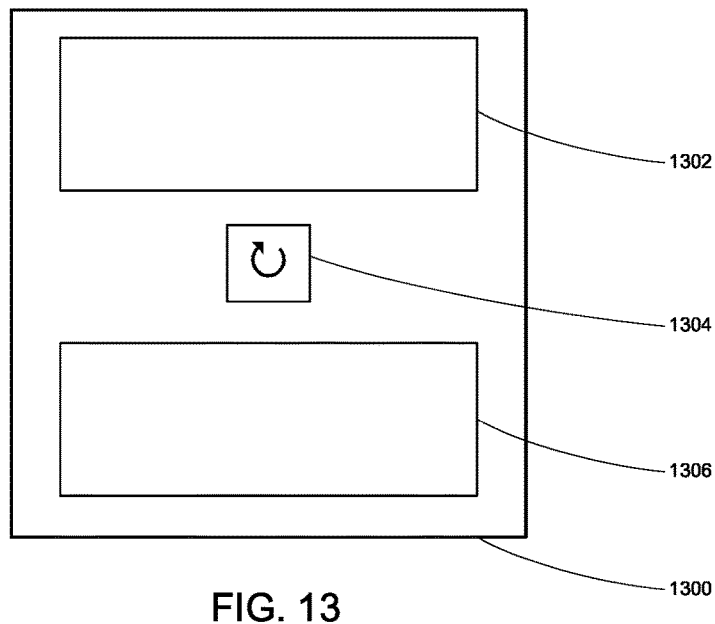
FIG. 13 is a simplified screenshot of the display of the client device of FIG. 7.

FIG. 13 is a simplified screenshot of the display of the client device of FIG. 7. The display 1300 (which may be a screen or window within a screen, and so on) includes a current player's game window 1302, a spin or activate button 1304, and at least one other player's game window 1306 showing at least part of the game state information displayed in window 1302. In the multi-player games of at least the fifth embodiment, the individual game being played by the user of the client device is shown in full in window 1302, and at least one other game is shown in at least one other window 1306, which as noted above, may comprise only part of the other game state(s) and may be resized and otherwise displayed in a different style to the current player's window. Other user interface elements are provided as necessary and appropriate. A user interface of the type shown in FIG. 13 is brought up when a player is confirmed as having entered a multi-player game.

An embodiment relating to a slots style game of chance will be described in more detail. In this game, typically five (but optionally more or fewer) reels are shown, of the type used in classic 'fruit machine' gaming devices. Each reel contains a plurality of symbols, which are typically chosen in accordance with a game theme. Each round of the game involves pressing a spin button (or otherwise activating the next round), which causes at least one (and usually all five) of the reels to start spinning, displaying different symbols in succession on each reel. In some organised way, the reels eventually stop spinning, to reveal the spin result. Game rules determine which combinations of symbols represent a 'win' and which do not. If a 'win' is determined, typically a prize or similar is awarded, which is typically an amount of game units (which may or may not be cash or equivalent thereof). Typically a number of game units is deducted for each spin.

Also typically, the amount of game units wagered on each spin can be determined by the player, and in some cases the volatility of the game can also be controlled by the player (for example either resulting in a relatively higher probability of smaller wins, or a relatively lower probability of larger wins). Typically the game logic applied by the game engine produces results within a rigidly defined set of statistics (indeed this is usually required in order to comply with the law for monetary-based games). Spins with larger amounts wagered will provide correspondingly larger prizes in the event of a win.

In this embodiment, games may be referred to as 'slots games' or 'slots', game engines may be referred to as slot engines, round tokens may be referred to as spin tokens (if not already referred to as that), and so on. It will be appreciated that other game types are possible, and indeed in the present embodiment, it will be appreciated that—with an appropriate adjustment to user interface and payout calculations, other game types may be possible to play alongside slots games within the multi-player game described below.

The process of dealing with asynchronously received spin data will now be described. It will be appreciated that the principles discussed below apply equally to other types of games, where spin data may be some other form of result data, and so on.

Figure 14:
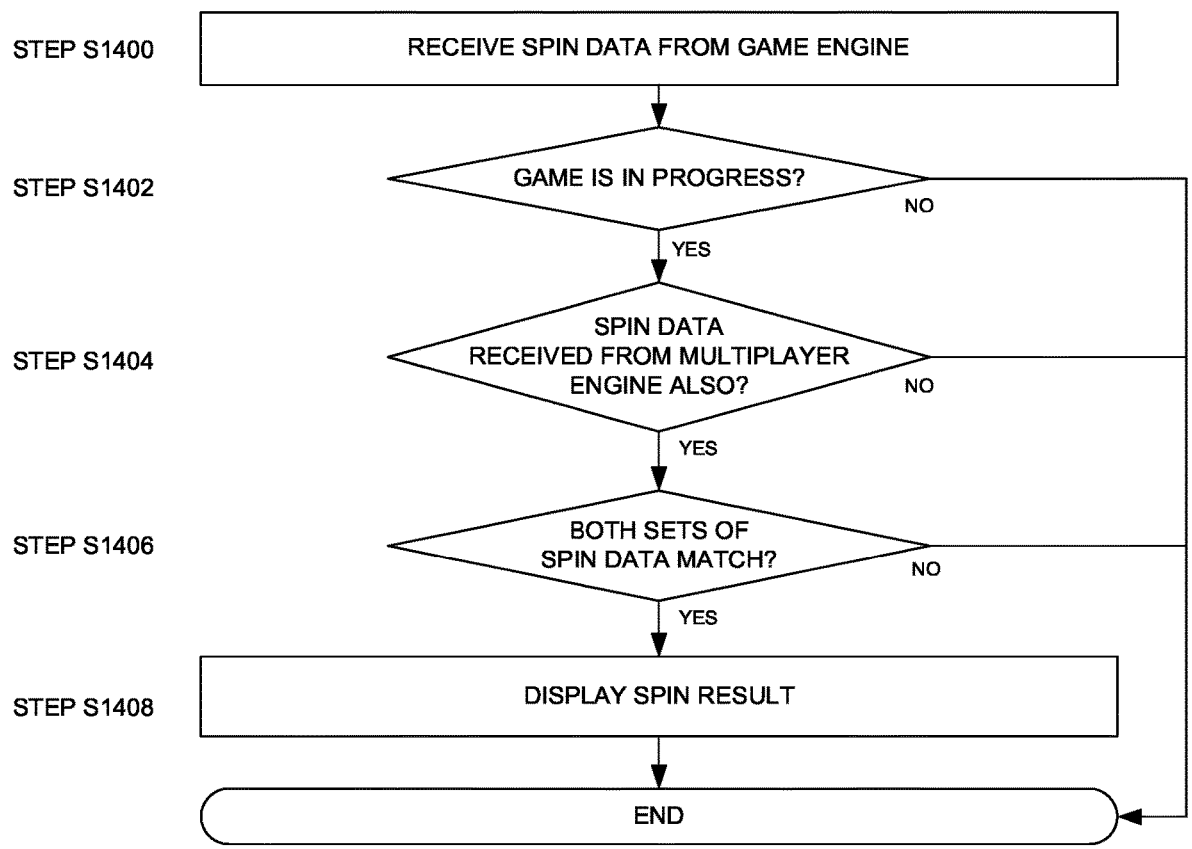
FIG. 14 is a flowchart showing the process of receiving spin data from the game engine.

FIG. 14 is a flowchart showing the process of receiving spin data from the game engine. In step S1400, spin data is received from the game engine, typically via a secure, high performance (low latency) web socket connection. The spin data relates only to the game played by the current player. If the game is in progress (S1402)—that is, has started but has not yet finished—then it is tested to see if (S1404) the spin data has also been received from the multi-player engine in the aggregated spin result data. If that is true, then it is tested to see if the two sets of spin data match (S1406). Only if all these steps are affirmative will the spin result be displayed (S1408). Otherwise, the display is deferred until all the data is received and verified. Otherwise the process ends.

Figure 15:
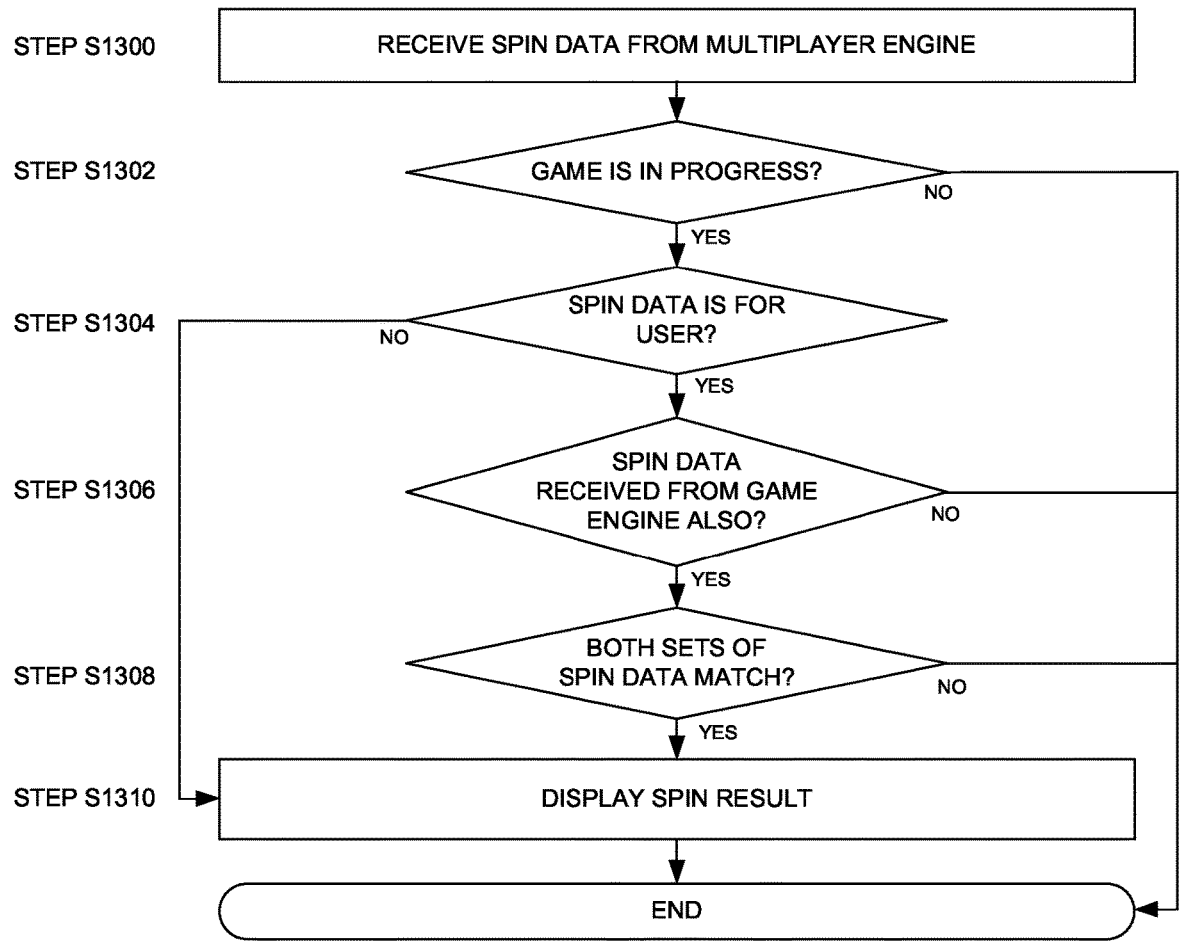
FIG. 15 is a flowchart showing the process of receiving spin data from the multi-player engine.

FIG. 15 is a flowchart showing the process of receiving spin data from the multi-player engine. After the spin data is received as the aggregated list of spin results from the multi-player engine (S1300), it is tested to see if the game is in progress (S1302). If the spin data is not for the current player (S1304), it is straight away displayed (S1310), since that is the only source of the data, and the timing is not critical to the user experience, because it is not the player's game and the player does not have any possibility of interacting with the timing or the outcome of the spin. If the spin data does relate to the current player (S1304), it is tested to see if the data has been received also from the game engine (S1306), and that both sets of data match (S1308). If so, the spin data is displayed as before (S1310).

Figure 16:
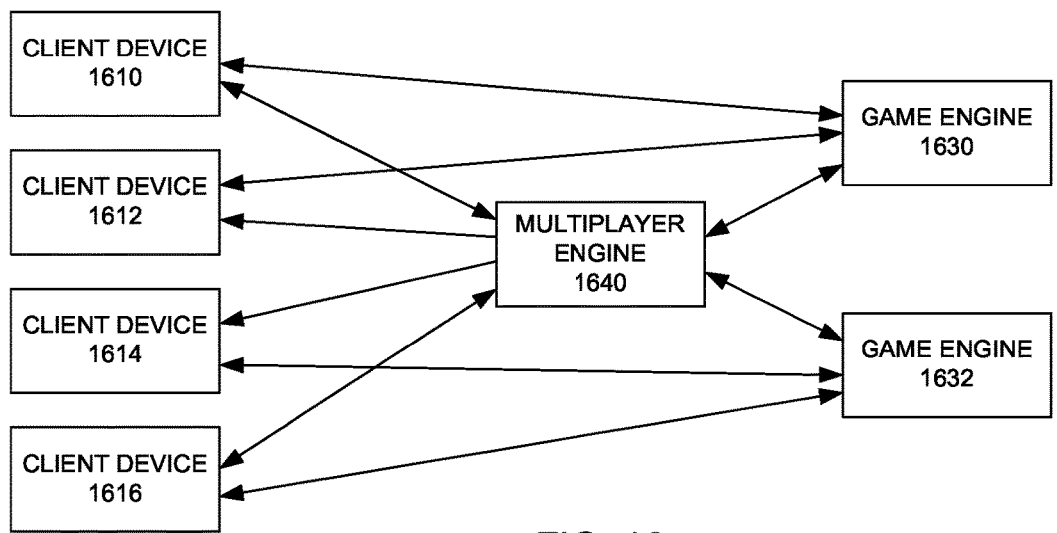
FIG. 16 is a schematic of the game system of FIG. 6 including multiple client devices.

FIG. 16 is a schematic of the game system of FIG. 6 including multiple client devices. The client devices 1610, 1612, 1614, 1616 are shown, as well as a first and second game engine 1630, 1632, and the multi-player engine 1640. Here a variant of the present embodiment is shown in which the multi-player engine 1640 provides multi-player game sessions for potentially multiple games within the same game engine, but also multiple games on multiple respective game engines. In one further variant, the same game type (or class of game type) is being played, but routed via multiple game engines, all hosting the same game type (or class of game type). This can create greater efficiency in the system, and present a seamless multi-player experience to the players, without needing to expose the underlying complication.

In another variant, any appropriate (and varying) game types can be played within the same multi-player game. Where game rules and properties vary, an appropriate normalization is provided by the multi-player game engine 1640 in order to allow all players to compete on equal terms. For example, the attack power in game types that have slower spins may be adjusted upwards when attacking players who are playing games with small time periods between spins. This or any other aspect of the multi-player game may be adjusted as necessary to normalise the statistical properties of each game for each player.

Figure 17:
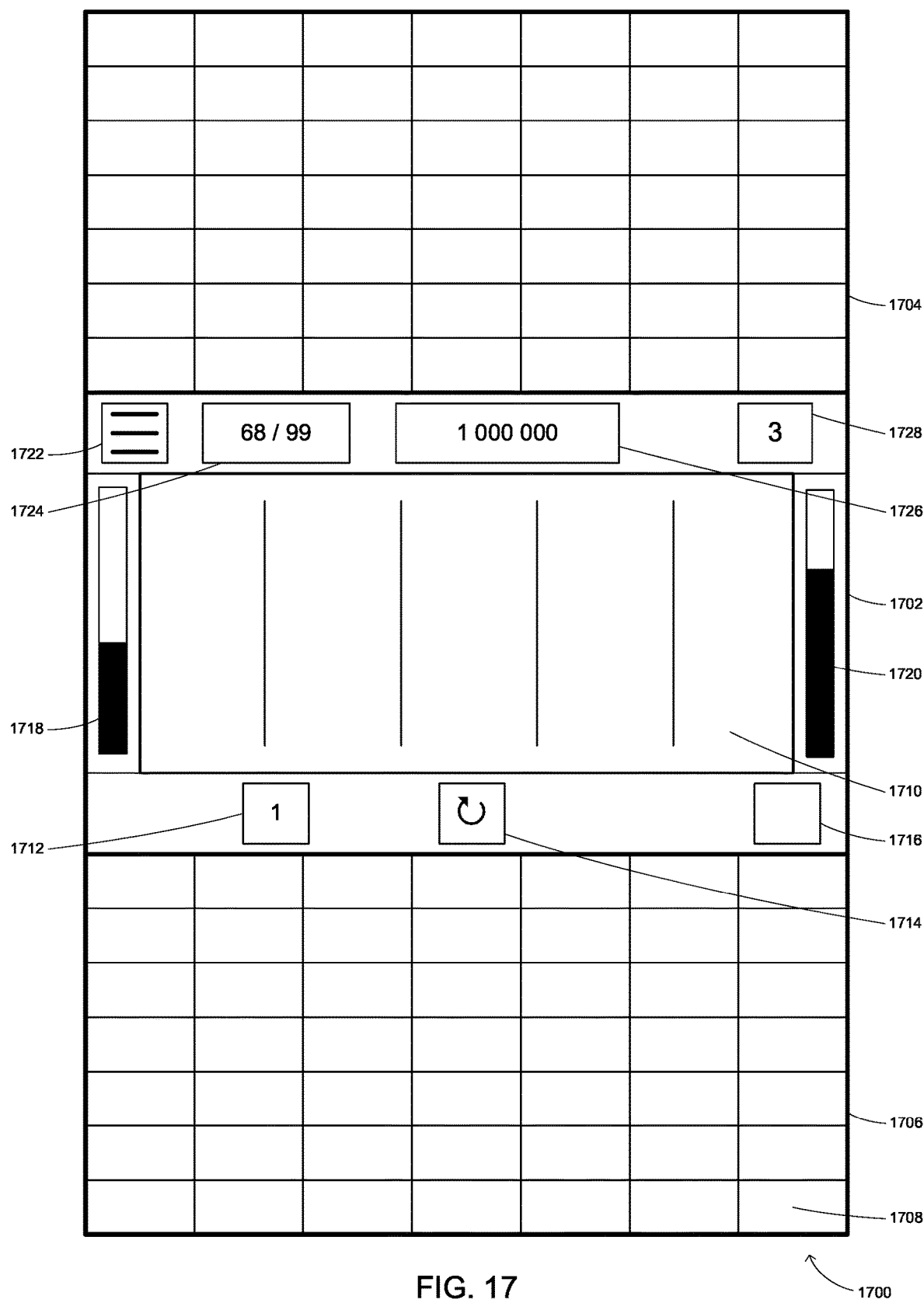
FIG. 17 is a screenshot of the display of the client device of FIG. 7 in more detail.

FIG. 17 is a screenshot of the display of the client device of FIG. 7 in more detail, showing an example game mode according to the present embodiment(s). The screen layout 1700 includes a central portion 1702 corresponding to the current player's game (which corresponds closely but not necessarily exactly to the layout of the same game when played in single player mode, and a top portion 1704 and bottom portion 1706 having individual mini-windows showing the game state (including latest spin result and various properties associated with the current multi-player game) for each other player in the multi-player game. A sample window 1708 is indicated. The present layout includes 49 mini windows above the main game area, and 49 windows below, meaning that in total there are 99 players in the multi-player game. It will be appreciated that the present design, while providing an aesthetically satisfying number of players in the game, is not so limited, and any arbitrary number of players, and any arbitrary user interface design, may be provided as desired.

The player's game window 1702 includes five sets of reels 1710, an optional wager amount (in real money or otherwise), a spin button 1714 and an optional attack mode button 1716. Also shown is a health bar 1718 and a mana bar 1720 used in a particular game mode, but more or fewer bars 1718, 1720 (or none) may be provided for any appropriate purpose within the game. A menu button 1722, current rank within the game indicator 1724, shared pot amount 1726 and number of knock-outs of other players counter 1728 are shown. Other user interface elements (or fewer user interface elements) may be provided as appropriate for any particular game type. It will be appreciated that the present features are not limited to slot type games, or indeed to games of chance as such, or gaming type games in general.

Figure 18:
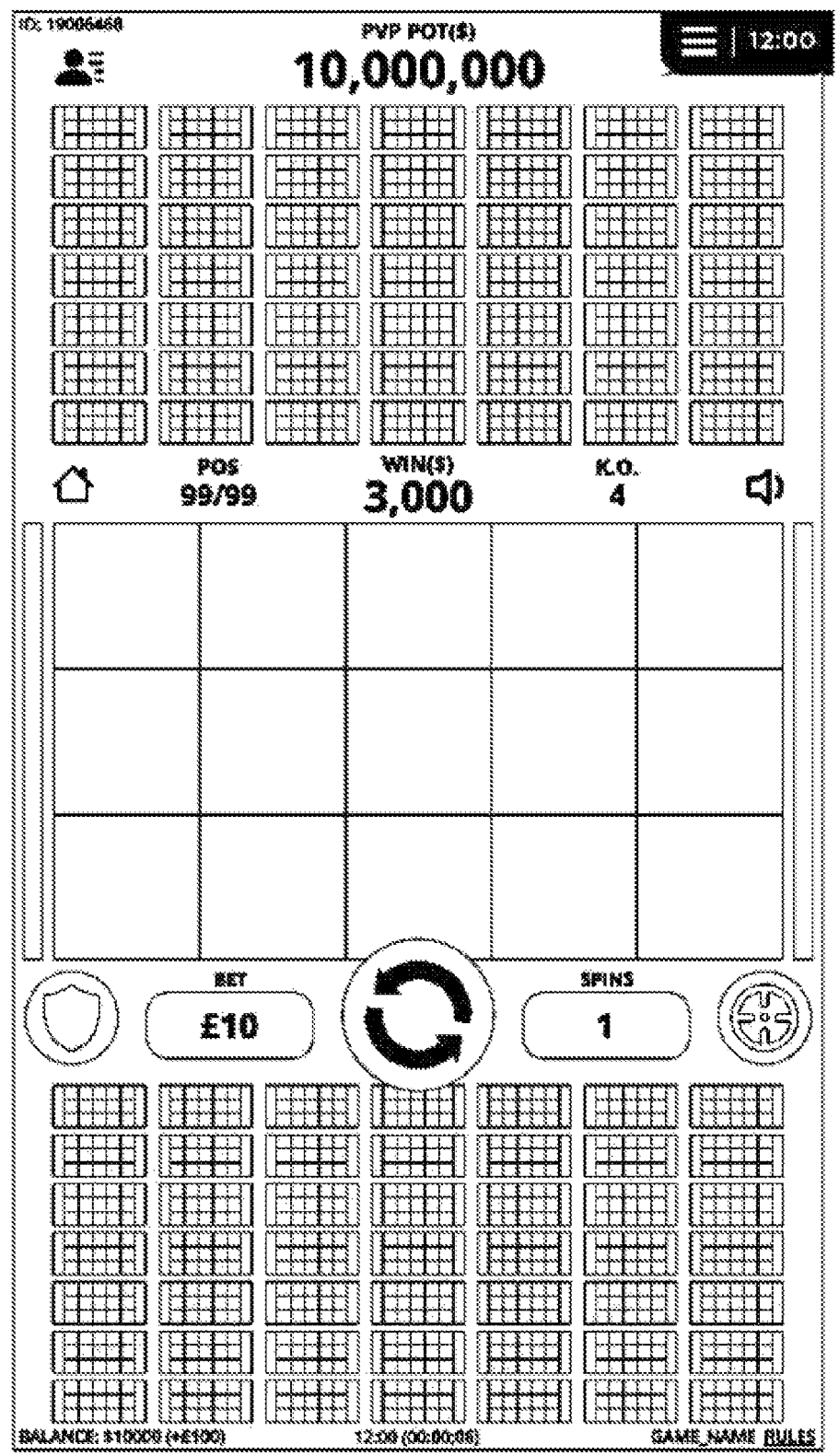
FIG. 18 is a screenshot showing the display in FIG. 17 in more detail.

FIG. 18 is a screenshot showing the display in FIG. 17 in more detail. This shows a more detailed version of the screen display with more refined graphical elements. Other permutations of the design are of course possible.

A particular game mode will now be described in more detail. It will be appreciated that specific features described in relation to this specific example may have broader applicability. In general a feature should be considered to illustrate an underlying concept that would be apparent to a skilled person in a relevant art, and to be applicable in all other cases except when not practicable or appropriate.

The present game mode is known as Project 99. In a nutshell, it is a knock-out fight type of game in which more than two combatants are engaged and the victor is the last surviving participant. The maximum number of players in a single multi-player game (also known as a 'battle') is 99. However, this is only restricted by the user interface of the game. Technically, the game is capable of managing more than 99 players. Alternative game modes may also support numbers of players the same as, fewer than, or greater than 99, as appropriate.

The present game mode provides a platform that takes the general concept of a multi-player game but evolves it into a true competition, where actual gameplay and mechanics allow players to truly vie against one another. At the same time, the concept avoids the biggest challenges of liquidity (differing stakes, games, jurisdictions, operations) and game complexity, allowing players to play with from 1 to 98 other players, and with a zero learning curve starting point; anyone who can press the spin button can play. Appropriate balancing of the game/multi-player engine can ensure that a consistent return-to-player (RTP) value is provided for all players.

Project 99 provides different playing modes; true progression; minimal waiting—standard slot games are always available to play; and opportunities exist for the player to compete against a smaller numbers of players but also bot agents.

By default, the game is open in a single-player mode (slot) that is already familiar to players. The operator website (game engine) provides an interface for the player to enter the queue for a multi-player slot (such as Project 99). Due to the waiting period spent in the queue (typically no more than a minute or two), the player can continue spinning the selected single-player game as normal while waiting. There is normally no entry fee for players that join a multi-player game. Players that entered the queue are given an option to exit the battle before it starts (that is, before the countdown appears); but while a multi-player game is in progress, the only way to end the game is to stay inactive and eventually get killed, or play until knocked out by another player. There is normally no exit button when the multi-player game is ongoing. If the player exits to the operator's lobby, upon returning to the game the same multi-player game will resume.

Because of different compliance requirements concerning the length of a spin, in one variant of the game mode, players are grouped based on those requirements. However, it is preferred to avoid building multiple versions of the game for different jurisdictions, for example so as not to split liquidity, but also to avoid associated technical inefficiencies. In another variant, therefore, the game is balanced using mathematical adjustments to the game logic, so all players can remain in the same game pool. In the preferred embodiment, a single pool of players (having an associated single pool of 'liquidity') is provided, with appropriate normalisation of the game engines and/or multi-player engine to ensure a consistent return-to-player (RTP) value for all players.

Normally any ordinary single player slot game can be played in multi-player mode with minimal modification to work with Project 99. Players participating in the same Project 99 multi-player game can all be playing different slot games. The multi-player game will by default always be loaded with default settings, for example Random Attack mode & Balanced Health mode (see below), 1,000 points (50%) in health, and 0 knock-outs (0%) in knock-out power. However, it is also possible to have player preferences remembered, for example in relation to default attack and defence types. In the Project 99 game, the action starts as soon as anybody presses a spin button; a player needs to spin in order to attack. Two fundamental things happen at this point: 1) the result of the spin becomes known, and user gets paid (in case of a win), and 2) the Project 99 logic kicks in.

The Project 99 service consumes data from the slot and places it back in the Project 99 service. It operates through calculating and storing players energy, known as magical energy (or mana) that is calculated based on win multiple and two other variables specifically designed for Project 99 mechanics. The preferred formula is as follows:

$$\text{Mana} = \text{Win Multiple} \times (1 + \text{Power Adjustment}(\%) + \text{Knock-out Power}(\%)) \quad (1)$$

Different formulas, different variables, different coefficients, other numbers and types of attributes, and so on are of course possible within the general framework described herein. For example a simplified alternative formula could be:

$$\text{Mana} = \text{Win Multiple} \times (1 + (0.5 \times \text{Random\_Number})) \quad (2)$$

where Random_Number returns a random number between 0 and 1

Or alternatively the concept of mana (and the like) could be removed entirely, and a player health could be manipulated directly. A player health can be defined as a float, integer, or any other appropriate data type.

If a player is successful in the game (that is, wins a lot), he or she gets more mana and therefore is more powerful in that spin. The more people that a player kills, the more powerful he or she becomes.

The example game mode set out here is an example of a game mode which disadvantages players that choose not to spin (much or at all) in the game. In terms of expected outcome, the most effective strategy is to spin lots, which both earns health points, and maximises the chance of increasing the knock-out power (which is useful for the end-game), and maximises the chance of having a higher proportion of high win multiples. By winning on the slot, the player can collect defence/health points that add to his/her health and attack points which are used on the current attack. The more that players as a whole spin, the larger becomes the pot which is divided among the winner or winners.

Typically health goes up in case of a win in a spin, and goes down when a player gets attacked; attack points are earned by killing other players. Any appropriate algorithm can be used, if desired, to ensure that health is lost at a slower rate typically at the beginning of the game, and speeds up towards the end, therefore increasing the number of deaths. This is not essential.

There are various defence and attack modes the player can choose from in order to gain some control over the game. Adjusting the modes is optional, and without changing them, the player can still win the game with default settings. Some parts of the game, such as the random defence mode or random attack mode, may use random number generators (RNGs) to satisfy various compliance requirements and to ensure the level of randomness in the game.

The pot is divided among winners that finished in top positions (for example, in the case of 99 players, 20 players, say, may get a piece of the prize). For example, the player who finishes first will get a significant multiple of his or her original stake. This does not necessarily mean that players who came first will be rewarded with the highest prize; the win amount will depend on the stakes made during the game. That is, the higher are the stakes, the higher are win amounts. The players won't be allowed to see other players' wins, but only their own. Any appropriate scheme can be used to create, augment and/or divide the pot. It is more important to balance the return-to-player (RTP) amounts for different games and/or game engines within the same multi-player game.

The rules of Project 99 have been designed to take into consideration (and to mitigate or nullify) possible cheating schemes such as changing the stake amount to a higher amount to gain advantage over other players; standing idle and not spinning during the multi-player game; and various other timing-related cheating methods, such as delaying bonus play, speeding up spins, and so on.

Different playing modes will now be described, beginning with defence modes:

TABLE 2

Project 99 defence modes

| Defence mode | Definition | Defence/attack split |
|---|---|---|
| Defence | The safest mode when emphasis is on protection, less on attack | 50% defence, 50% attack (typically between 25-60% defence, 75-40% attack) |
| Balance (default) | The balanced mode | 25% defence, 75% attack (typically between 5-45% defence, 95-55% attack) |
| Attack | The riskiest mode when no points from a spin win are attributed to health, and everything goes into an attack | 0% defence, 100% attack (that is, a win does not boost health in this mode) |

Balance mode can be changed at any time during the multi-player game, but that will only effect future spins. Different attack modes will now be described:

TABLE 3

Project 99 attack modes

| Attack mode | Target selection | Conditions | Level of danger |
|---|---|---|---|
| Random (default) | All available attack power is aimed at contenders. The target is used randomly | Default choice | Low |
| Sniper | Aims at the weakest player in the game | If that player is already targeted by 6 players, the system will choose the next weakest with less than 6 attackers. If there are multiple targets with equal weakness, the system will | Medium |

TABLE 3-continued

Project 99 attack modes

| Attack mode | Target selection | Conditions | Level of danger |
|---|---|---|---|
| Hero | Aims at the strongest player in the game | randomly choose one of them The number of players that could target a Hero at any point in time is limited to 6. If a player is already targeted by 6 players, the system will choose the next strongest with less than 6 attackers. If there are multiple targets with equal strength, the system will randomly choose one of them | High |
| Vendetta | Aims at any player aiming at you | This helps in particular to protect people being sniped or in hero mode. This allows you to target more than 1 player, but only players targeting you and potentially increases your attack points in any spin. The mode is weaker when targeting nobody or one player | Very high |

It will be appreciated that the names of the attack and defence modes (and the names 'attack mode' and 'defence mode' themselves) may vary, and are not material to the technical operation of the present embodiment. Attack points are never stored, but are all used in the current attack right after the spin result is known. Hero and Vendetta modes are relatively more advanced modes in the game. The maximum number of players that can target any single player is 6. Ultimately, the largest factor influencing the outcome of a game is the random number generator that drives the basic slots game (or other game of chance) used by the player.

An optional (and usually not enabled) game mode called 'reviving' (also known as healing) will now be described. Reviving is a mode in which a knocked out player (that is, health equals 0) is given the last chance to remain in the game by spinning during a window of a predetermined length (such as 5, 10, 15, 20, 30, 45, 60, 90 and so on seconds) as long as the player has had a win in a previous time period of a certain length (such as 10, 15, 20, 25, 30, 40, 50, 60, 90, 120 and so on seconds), otherwise they are immediately killed. These timings may of course be varied as appropriate and/or desired. Each player only has one attempt to revive throughout a multi-player game, although there are conditions in which revival is disabled for everyone. In case of a win, the player is recovered and is back in the game. Attacking is not allowed, and all mana is converted into health in order to heal. While the player is attempting to recover, his/her health will be equal to zero. Therefore that player cannot be targeted until the health increases. If the player fails to get a win during 10 second window, that player is knocked out. Revive will not be allowed in case of the following scenarios: (1) when 20 players or less left in the battle (also applies to when a multi-player game starts with less than 20 players), and when the length of the battle had reached a maximum (typically set to 15 min). In the main embodiment, however, when a player's health reaches zero (or less), the player is officially and irrevocably 'dead' for that game.

If health is at or near a maximum, the value will cap at the max required to heal (that is, 2,000 points). The unused mana will be transferred to Attack. If the health is at zero, all mana will be converted to defence.

If a players health drops to zero (0), that player is considered down, and can no longer be attacked. The knock-out ("KO") is recorded in the system (both the time of a knock-out and by which player).

When a player knocks out another player, he or she will get a knock-out point in addition to all the knock-out points of that player. For example, if a player A with 0 KO points kills player B who has 1 KO point, that results in player A getting 2 KO points in total.

The knock-out power boost is calculated as follows. Other distributions and scaling is of course possible:

TABLE 4

| Knock-out power attack boost | |
|---|---|
| Number of KOs | Knock-out power (%) |
| 0-1 | 0% |
| 2-5 | 25% |
| 6-13 | 50% |
| 14-20 | 75% |
| 30 upwards | 100% |

It is estimated that approximately 20 attacks happen on average every three to four seconds when there are 99 players spinning. Increasing the number of deaths or slowing down spins will reduce the number of attacks over time.

In the case of a maximum number of players in the game (that is, 99), the winner is typically expected to do a maximum number of 300 spins. 300 spins×3 seconds (the typical duration of a spin)=15 min (the max duration of a game).

The average player will only be in the multi-player game for approximately 10 minutes. In the last minute, approximately 20 spins will take place.

The shared pot is divided between players that finished in the top, but depends on the number of initial participants. For example:

TABLE 5

| Pot distribution by size of multi-player game | |
|---|---|
| Number of players | Number of players sharing pot |
| 90-99 | 20 |
| 80-89 | 9 |
| 70-79 | 8 |
| 60-69 | 7 |
| 50-59 | 6 |
| 40-49 | 5 |
| 30-39 | 4 |
| 9-29 | 3 |
| 5-8 | 2 |
| 1-4 | 1 |

Approximately 25 players are expected to die in the last 150 seconds of the battle, which also helps preventing cheating in the last minutes of the game. Normally, the default health state is 1,000 points (equivalent to 50% health), and 0 points (equivalent to 0%) in attack (power).

Figure 19:
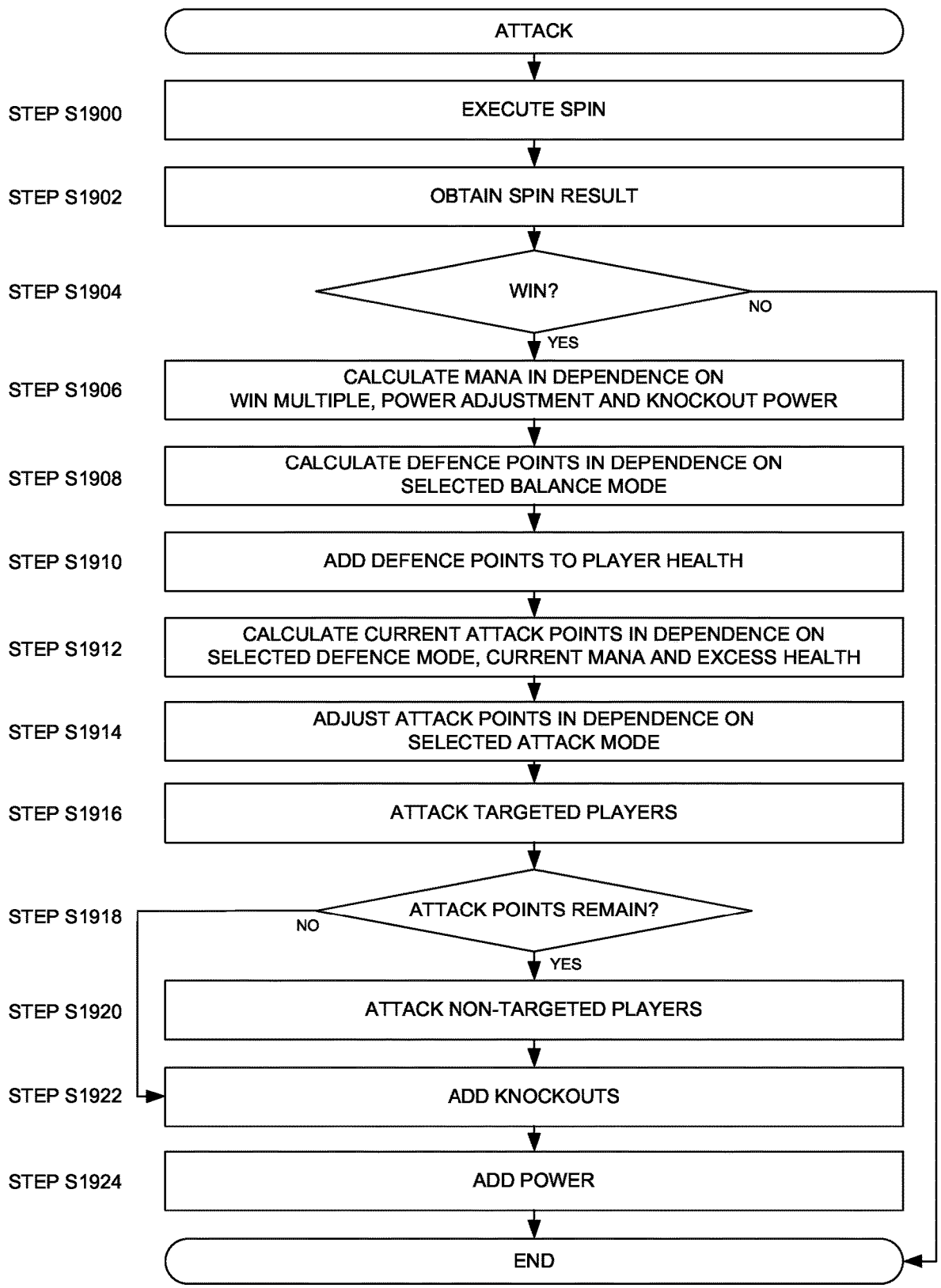
FIG. 19 is a flowchart showing the process of attacking in the game shown in FIG. 18.

FIG. 19 is a flowchart showing the process of attacking in the game shown in FIG. 18. The flowchart relates to the Project 99 game mode described above, but it will be appreciated that the principles and specific steps disclosed in this figure may be more broadly applied.

In step S1900 a spin is executed, for example by a player clicking a spin button. In step S1902, a spin result is obtained using the random number generator in the game engine. If the spin result is a win (S1904), a mana amount is calculated in dependence on the win multiple, power adjustment and knock-out power adjustment (see equation (1) above). For example, if a player wagers €1 on a spin and wins €6, the spin multiple is 6. If the power adjustment % is 10% and the current knock-out power is 25%, the mana total is 6+(10%+25%)×6=8.25.

In step S1908, the defence points are calculated in accordance with the currently selected defence mode (defence, balance, attack), unless the player has a current health of zero or less. For example, for the 'balanced' defence mode, the defence points are equal to 25% of the mana. In step S1910, the defence points are added to the player health. If the health then exceeds the maximum amount (2,000) then the excess health is added to the current attack points, which are calculated in step S1912 in dependence on the selected defence mode (defence, balance, attack), current mana and the aforesaid excess health. For example, in the balanced defence mode, 75% of the mana points are converted into attack points. In step S1914, the attack points are adjusted, if necessary, in accordance with the selected attack mode (random, sniper, hero or vendetta). In the case of the vendetta mode, for example, the total attack points are multiplied by the number of players targeting the current player; otherwise the attack points are unchanged.

Figure 20:
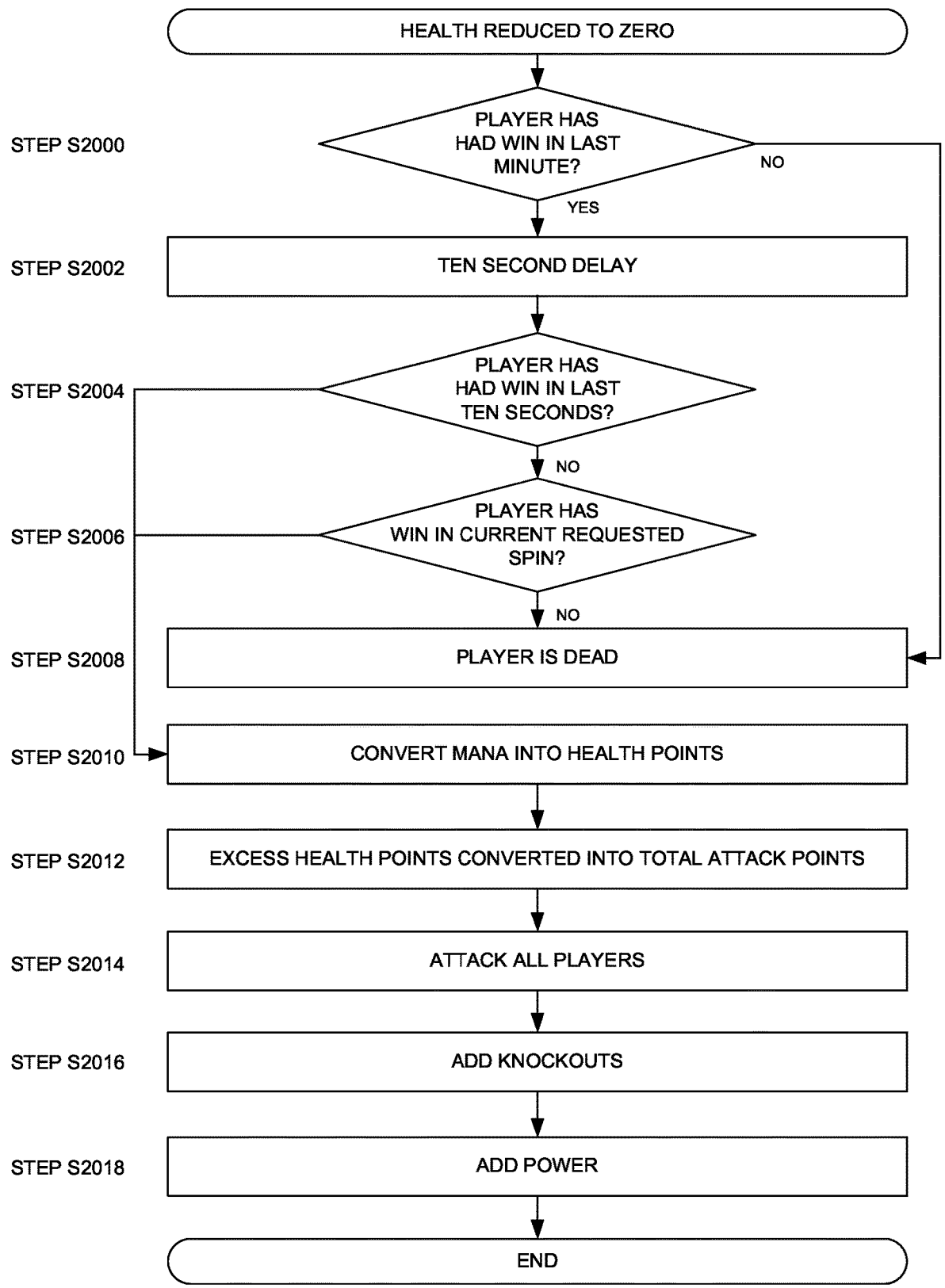
FIG. 20 is a flowchart showing the process in a variant of the preferred embodiment when a player health reaches zero for the game shown in FIG. 18.

In step S1916, the targeted players are attacked, and the attack points are deducted from the players' health values. If any players' health drops to zero or below, the player is 'dead', and can no longer take part in the game. In a variant of the present embodiment, the process shown below in FIG. 20 is followed, allowing the player a chance to 'revive'. If (S1918) there are any excess attack points (that is, the total health of the targeted player(s) was less than the total number of attack points), then non-targeted players are attacked (S1920) in any appropriate fashion.

In step S1922, if a knock-out is achieved of another player, the appropriate number of knock-out points are added to the current player's total. The knock-out power is then updated (S1924) to reflect any new totals of knock-outs.

FIG. 20 is a flowchart showing the process in a variant of the preferred embodiment when a player health reaches zero for the game shown in FIG. 18. Normally, when a player's health drops to zero or below, the player is 'dead', as described above. However, in the present variant: if (S2000) a player has had a win within the last minute (or any other appropriate time period), a ten second delay is taken (S2002), and it is then tested (S2004) to see if the player has had a win within the last ten seconds, or whether (S2006) the player has recorded a win in the currently requested spin (which may not yet be displayed to the player or recorded in the system). If neither of these tests are true, then the player is considered dead (S2008). Otherwise, if a successful recovery has been made, the player's current mana is converted (S2010) into health points. Any excess health points (if present) are converted into total attack points (S2012), and the relevant players are attacked in accordance with the currently selected attack mode (S2014). As with the flowchart of FIG. 19, knock-outs are added (S2016) and the knock-out power is updated (S2018) as appropriate.

Figure 21:
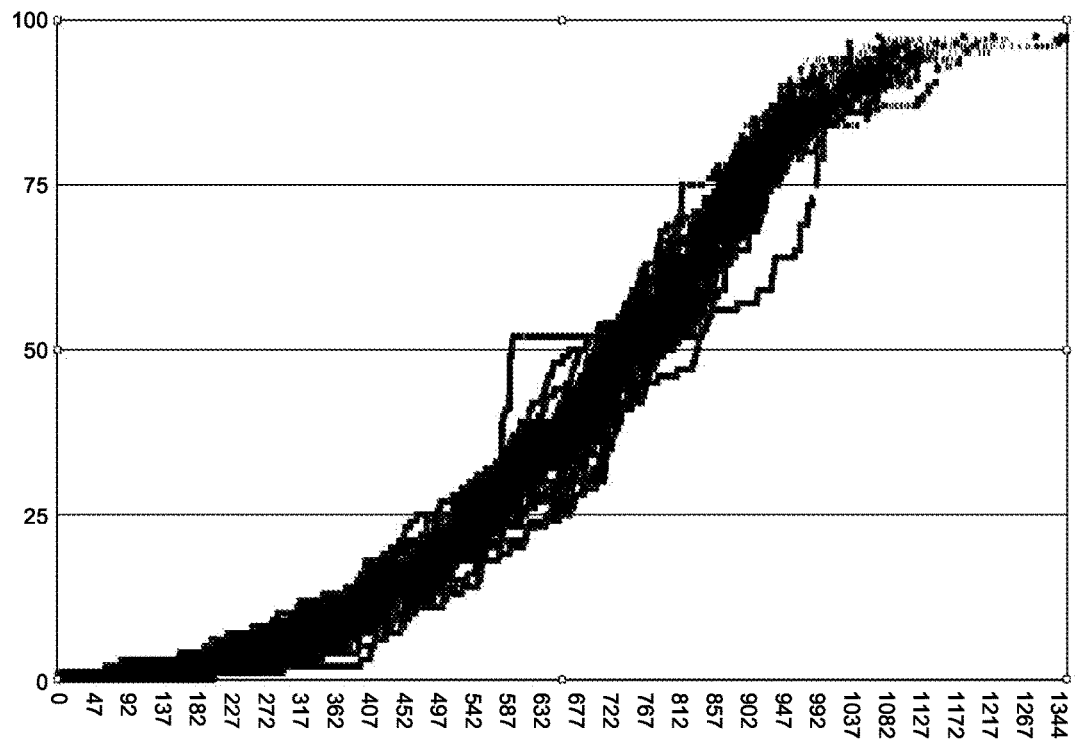
FIG. 21 is a graph showing accumulated deaths over time for the game shown in FIG. 18.

FIG. 21 is a graph showing accumulated deaths over time for the game shown in FIG. 18 for a number of repeated simulations. The horizontal axis shows time in seconds, and the vertical axis shows number of players eliminated. It will be appreciated that the various processes and selected numeric values described above produce a relatively continuous, smoothly varying function which follows a relatively predictable path to a relatively predictable duration of game.

Some final further embodiments of the game system described above will now be discussed.

Figure 22:
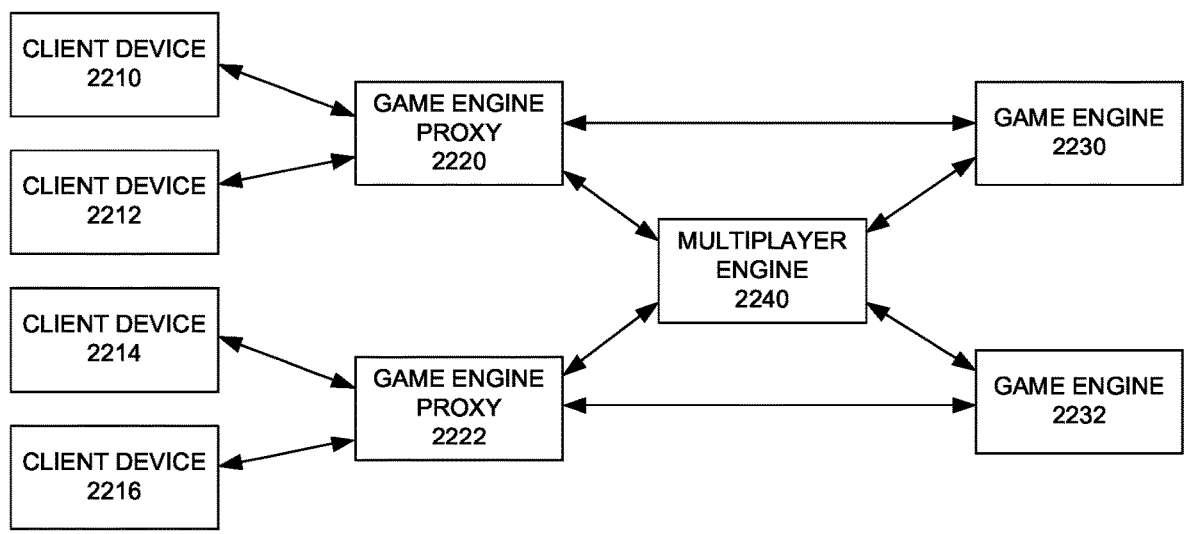
FIG. 22 is a schematic of a game system including a game engine proxy server.

FIG. 22 is a schematic of a game system including a game engine proxy server. A plurality of client devices 2210, 2212, 2214, 2216, game engines 2230, 2232 and a multi-player engine 2240 are shown, as in FIG. 16, with an additional set of game engine proxies 2220, 2222. The game engine proxies act as relays for the inter-device communications set out in FIG. 16 and elsewhere, but can as appropriate and necessary incorporate additional functionality, for example to provide additional security, caching and/or network routing logic. This can allow the multiple lines of communication to be encapsulated within a single connection, simplifying the network architecture at the client devices 2210, 2212, 2214, 2216.

Figure 23:
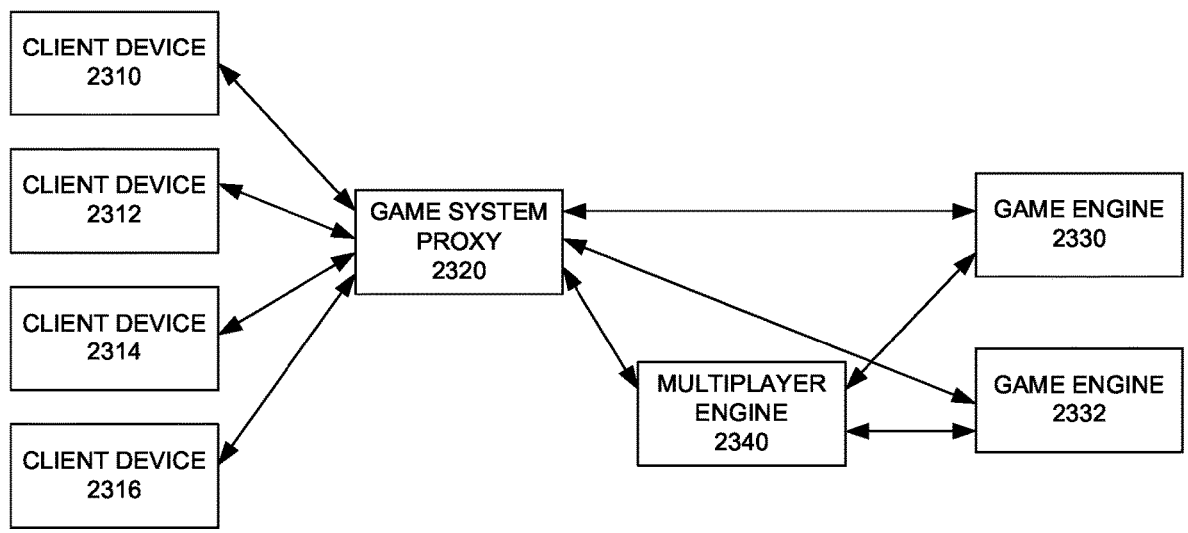
FIG. 23 is a schematic of a game system including a game system proxy server.

FIG. 23 is a schematic of a game system including a game system proxy server. In this case, the client devices 2310, 2312, 2314, 2316, game engines 2330, 2332 and multi-player engine 2340 are provided as before. In addition, a game system proxy server 2320 is provided, which performs a similar function (or set of functions) to the proxies 2230, 2232 of FIG. 22, but furthermore aggregates multiple game servers. Thus, a single point of reference in the network can aggregate multiple games from multiple game engines within a single point of contact.

It will be appreciated that other network connections, other architectures of game server, multi-player server and client device can be provided, and any number of different games and game modes can be provided as appropriate and desired. Other variations are of course possible without departing from the spirit and scope of the invention.

The invention claimed is:

1. A multi-player game system for allowing a user to play a repeatable game of chance in a competitive context against at least one competitor, the game system comprising:
   a client device operable by the user, providing a user interface module which is configured to display a state of the game of chance played by the user and to receive user input requesting a new result of the game of chance;
   a game engine, configured to provide the new result of the game of chance to the client device on receipt of a request from the client device to provide the new result,
   wherein the system further comprises a multi-player engine, configured to:
      process multi-player game data representing a multi-player game that links a plurality of games of chance being played by a respective plurality of players on a respective plurality of client devices, said plurality of players consisting of said user and at least one competitor, and
      transmit to the client device state data relating to at least one aspect of the state of the plurality of games of chance, to allow the client device additionally to display at least one aspect of the state of said at least one competitor's games,
   wherein each result of the game of chance is associated with a round,
   wherein the multi-player engine is further configured to generate a round token associated uniquely with each round of the game of chance, and to transmit the round token to the client device, wherein the client device is further configured to transmit the round token to the game engine with the request for a new result, and
wherein the game engine is further configured to transmit a round token verification request to the multi-player engine,
wherein the multi-player engine is yet further configured to receive the round token verification request and to transmit a positive or negative verification result to the game engine, and
wherein the game engine is yet further configured to transmit the new result to the client device only if the verification result is positive.

2. The multi-player game system according to claim 1, wherein the client device is configured to connect to the game engine by a first connection type, and to connect to the multi-player engine by a second connection type, wherein the second connection type uses the Web Socket protocol.

3. The multi-player game system according to claim 1,
wherein, in response to the respective player indicating that they wish to join a multi-player game, the client device is configured to transmit a join request to the game engine,
wherein the game engine is configured, in response to receiving the join request, to transmit a ready request to the multi-player engine, the ready request including player data,
wherein the multi-player engine is configured, in response to receiving the ready request from the game engine, to generate a player token and to transmit the player token to the game engine,
wherein the game engine is further configured, in response to receiving the player token, to transmit the player token to the client device,
wherein the client device is further configured, in response to receiving the player token, to transmit a connection request to the multi-player engine, the connection request including the player token, and
wherein the multi-player engine is further configured, in response to receiving the connection request, to validate the player token and, if it is valid, to accept the requested connection.

4. The multi-player game system according to claim 1, wherein a plurality of types of games of chance may be selected, and the client device is configured to transmit a request to the game engine to select one said game of chance,
wherein other players in the multi-player game may select a different said game of chance, wherein each game of chance has a respective set of rules including at least one of: associated pay-out structure and minimum time between new results, and
wherein the multi-player engine is configured to normalize the results of each game in the multi-player game in dependence on their respective set of rules.

5. The multi-player game system according to claim 1, further comprising at least one further game engine, and wherein the client device is configured to select one of the game engines, and to communicate with the selected game engine to initiate the game of chance on the selected game engine, and
wherein other players in the multi-player game may select a different game engine.

6. The multi-player game system according to claim 1, wherein the state data transmitted by the multi-player engine to each client device includes for each player:

first game state data associated with the game of chance on the game engine, and
second game state data extracted from the multi-player game data, and
wherein the client device is further configured to display the first game state data and second game state data in a unified form for each player.

7. The multi-player game system according to claim 6,
wherein the first game state data includes at least one state selected from: a win, a loss, a win or loss, a win multiple, a representation of the game result, and any other state data relating to the game of chance, and
wherein the second game state data includes at least one state selected from: an attribute of the player, a state related to attacks on other players, a selected attack mode, a selected defense mode, a state related to defending against attacks from other players, a list of players, in particular a list of players having a particular attribute, a ranking within the multi-player game, a history of interactions between at least two players, aggregated statistics relating to the game results of a plurality of the players, and a measure of health, mana and/or power.

8. The multi-player game system according to claim 6, wherein the multi-player engine is configured to process at least one state from the second game state data to modify it in dependence on at least one state from the first game state data.

9. The multi-player game system according to claim 1, wherein the multi-player engine is further configured to normalize the multi-player game data to provide a substantially consistent return-to-player (RTP) value for every player.

10. The multi-player game system according to claim 1, wherein the game engine is configured to transmit to the multi-player engine at least one of: an indication that another player won, and an indication of a win multiple for another player, and at least one of the multi-player engine and the client device is configured to generate a representation of a game result that corresponds substantially to the indication that another player won or an indication of a win multiple, and to display the representation of the game result on the client device.

11. The multi-player game system according to claim 10, wherein the game of chance is associated with a grid having a plurality of grid locations, the game result is defined by a subset of the grid locations, and determining a representation of a game result comprises generating a representation of the subset of the grid locations associated with the game result.

12. The multi-player game system according to claim 1,
wherein the multi-player engine is configured to transmit at least a portion of the multi-player game data to the game engine, and
wherein the game engine is configured to award at least one prize to at least one respective player in dependence on the multi-player game results.

13. The multi-player game system according to claim 1,
wherein the multi-player game data comprises at least one attribute associated with each client device; and the multi-player engine is further configured to modify at least one of said at least one attribute in response to a game result transmitted by the game engine meeting a predetermined criterion, and
wherein the multi-player game engine is further configured to determine whether modified values of said at least one of said at least one attribute corresponds to a game loss condition and, if so, determining the client device associated with said at least one of said at least one attribute to be eliminated from the multi-player game.

14. A multi-player game system for allowing a user to play a repeatable game of chance in a competitive context against at least one competitor, the game system comprising:
   a client device operable by the user, providing a user interface module which is configured to display a state of the game of chance played by the user and to receive user input requesting a new result of the game of chance;
   a game engine, configured to provide the new result of the game of chance to the client device on receipt of a request from the client device to provide the new result,
   wherein the system further comprises a multi-player engine, configured to:
      process multi-player game data representing a multi-player game that links a plurality of games of chance being played by a respective plurality of players on a respective plurality of client devices, said plurality of players consisting of said user and at least one competitor, and
      transmit to the client device state data relating to at least one aspect of the state of the plurality of games of chance, to allow the client device additionally to display at least one aspect of the state of said at least one competitor's games,
   wherein, in response to the respective player indicating that they wish to join a multi-player game, the client device is configured to transmit a join request to the game engine,
   wherein the game engine is configured, in response to receiving the join request, to transmit a ready request to the multi-player engine, the ready request including player data,
   wherein the multi-player engine is configured, in response to receiving the ready request from the game engine, to generate a player token and to transmit the player token to the game engine,
   wherein the game engine is further configured, in response to receiving the player token, to transmit the player token to the client device,
   wherein the client device is further configured, in response to receiving the player token, to transmit a connection request to the multi-player engine, the connection request including the player token, and
   wherein the multi-player engine is further configured, in response to receiving the connection request, to validate the player token and, if it is valid, to accept the requested connection.

15. A multi-player game system for allowing a user to play a repeatable game of chance in a competitive context against at least one competitor, the game system comprising:
   a client device operable by the user, providing a user interface module which is configured to display a state of the game of chance played by the user and to receive user input requesting a new result of the game of chance;
   a game engine, configured to provide the new result of the game of chance to the client device on receipt of a request from the client device to provide the new result,
   wherein the system further comprises a multi-player engine, configured to:
      process multi-player game data representing a multi-player game that links a plurality of games of chance being played by a respective plurality of players on a respective plurality of client devices, said plurality of players consisting of said user and at least one competitor, and
      transmit to the client device state data relating to at least one aspect of the state of the plurality of games of chance, to allow the client device additionally to display at least one aspect of the state of said at least one competitor's games,
   wherein a plurality of types of games of chance may be selected, and the client device is configured to transmit a request to the game engine to select one said game of chance,
   wherein other players in the multi-player game may select a different said game of chance, wherein each game of chance has a respective set of rules including at least one of: associated pay-out structure and minimum time between new results, and
   wherein the multi-player engine is configured to normalize the results of each game in the multi-player game in dependence on their respective set of rules.

16. A multi-player game system for allowing a user to play a repeatable game of chance in a competitive context against at least one competitor, the game system comprising:
   a client device operable by the user, providing a user interface module which is configured to display a state of the game of chance played by the user and to receive user input requesting a new result of the game of chance;
   a game engine, configured to provide the new result of the game of chance to the client device on receipt of a request from the client device to provide the new result,
   wherein the system further comprises a multi-player engine, configured to:
      process multi-player game data representing a multi-player game that links a plurality of games of chance being played by a respective plurality of players on a respective plurality of client devices, said plurality of players consisting of said user and at least one competitor, and
      transmit to the client device state data relating to at least one aspect of the state of the plurality of games of chance, to allow the client device additionally to display at least one aspect of the state of said at least one competitor's games,
   wherein the state data transmitted by the multi-player engine to each client device includes for each player:
   first game state data associated with the game of chance on the game engine, and
   second game state data extracted from the multi-player game data, and
   wherein the client device is further configured to display the first game state data and second game state data in a unified form for each player.

17. A multi-player game system for allowing a user to play a repeatable game of chance in a competitive context against at least one competitor, the game system comprising:
   a client device operable by the user, providing a user interface module which is configured to display a state of the game of chance played by the user and to receive user input requesting a new result of the game of chance;
   a game engine, configured to provide the new result of the game of chance to the client device on receipt of a request from the client device to provide the new result,
   wherein the system further comprises a multi-player engine, configured to:

process multi-player game data representing a multi-player game that links a plurality of games of chance being played by a respective plurality of players on a respective plurality of client devices, said plurality of players consisting of said user and at least one competitor, and transmit to the client device state data relating to at least one aspect of the state of the plurality of games of chance, to allow the client device additionally to display at least one aspect of the state of said at least one competitor's games, wherein the game engine is configured to transmit to the multi-player engine at least one of:

an indication that another player won, and an indication of a win multiple for another player, and at least one of the multi-player engine and the client device is configured to generate a representation of a game result that corresponds substantially to the indication that another player won or an indication of a win multiple, and to display the representation of the game result on the client device.

18. The multi-player game system according to claim 17, wherein the client device is a plurality of client devices, each being provided with a non-transitory computer-readable storage medium storing computer program code which, when executed by a processor in the client device causes the client device to:

provide an interface to allow a respective user of the client device to play a respective game of chance, and to display a result of the game of chance;

receive multi-player result data relating to at least one other user playing at least one other respective game of chance, the multi-player result data including at least one respective indication of at least one of: a win, a win amount and a win multiple relating to said at least one other respective game of chance;

process the multi-player result data to determine at least one game result corresponding substantially to said at least one indication; and display said at least one game result in combination with the displayed result of the game of chance.

19. The multi-player game system according to claim 18, wherein said at least one other game of chance is different to the game of chance played by the user of the client device, and wherein said determined at least one game result relates to the game of chance played by the user of the client device.

20. A multi-player game system for allowing a user to play a repeatable game of chance in a competitive context against at least one competitor, the game system comprising:

a client device operable by the user, providing a user interface module which is configured to display a state of the game of chance played by the user and to receive user input requesting a new result of the game of chance;

a game engine, configured to provide the new result of the game of chance to the client device on receipt of a request from the client device to provide the new result, wherein the system further comprises a multi-player engine, configured to:

process multi-player game data representing a multi-player game that links a plurality of games of chance being played by a respective plurality of players on a respective plurality of client devices, said plurality of players consisting of said user and at least one competitor, and transmit to the client device state data relating to at least one aspect of the state of the plurality of games of chance, to allow the client device additionally to display at least one aspect of the state of said at least one competitor's games, wherein the multi-player game data comprises at least one attribute associated with each client device; and the multi-player engine is further configured to modify at least one of said at least one attribute in response to a game result transmitted by the game engine meeting a predetermined criterion, and wherein the multi-player game engine is further configured to determine whether modified values of said at least one of said at least one attribute corresponds to a game loss condition and, if so, determining the client device associated with said at least one of said at least one attribute to be eliminated from the multi-player game.

21. The multi-player game system according to claim 20, wherein the game system comprises:

at least one game server, being provided with a non-transitory computer-readable storage medium storing computer program code which, when executed by at least one processor in said at least one game server, causes said at least one game server to:

repeatably compute a result of the game of chance in response to a request from the client device operated by the user; and allocate a prize to the user if the game result is a win;

a plurality of client devices, each being provided with computer program code which, when executed by a processor in the client device causes the client device to:

communicate with said at least one game server to request said result of the game of chance;

receive each result of the game of chance; and display the result of the game of chance, wherein said at least one game server is further caused to:

store the multi-player game data representing a multi-player game being played between users of said plurality of client devices; and modify the at least one of said at least one attribute if the game result is a win.

22. The multi-player game system according to claim 21, wherein the plurality of client devices are further configured to receive at least one further result of at least one respective further game of chance associated with at least one other of said plurality of client devices; and to cause said at least one further result to be displayed in combination with the result of said game of chance.

23. The multi-player game system according to claim 22, wherein if a player wins the game of chance, said at least one game server is configured to do at least one of: improve the respective attribute of the player, and worsen the respective attribute of at least one other player.

24. The multi-player game system according to claim 22, wherein attributes are improved and worsened in accordance with a ratio or other quantitative relationship selected by the player, wherein said at least one other player is selected in accordance with a predefined player selection rule, and wherein the player selection rule is selected by the player, preferably from at least one of: other players who have attacked the player, players with a most favorable attribute value, players with a least favorable attribute value, and randomized.

* * * * *